US005549362A

United States Patent [19]
Broome

[11] Patent Number: 5,549,362
[45] Date of Patent: Aug. 27, 1996

[54] BRAKING SYSTEMS

[75] Inventor: William S. Broome, Inkberrow, United Kingdom

[73] Assignee: Grau Limited, United Kingdom

[21] Appl. No.: 513,308

[22] Filed: Aug. 9, 1995

Related U.S. Application Data

[63] Continuation of Ser. No. 113,213, Aug. 27, 1993, abandoned.

[30] Foreign Application Priority Data

| Sep. 3, 1992 | [GB] | United Kingdom | 9218604 |
| Jan. 16, 1993 | [GB] | United Kingdom | 9300807 |
| Jan. 22, 1993 | [GB] | United Kingdom | 9301196 |

[51] Int. Cl.⁶ .................................................. B60T 13/74
[52] U.S. Cl. .................................... 303/3; 303/15; 303/20; 303/123
[58] Field of Search ................................. 303/3, 7, 8, 9, 303/15, 20, 92, 122, 122.04, 123

[56] References Cited

U.S. PATENT DOCUMENTS

| 4,568,129 | 2/1986 | Stumpe | 303/7 |
| 4,671,578 | 6/1987 | Rothen et al. | 303/15 |
| 4,904,027 | 2/1990 | Skantar et al. | 303/15 |
| 5,104,203 | 4/1992 | Ferri | 303/15 |
| 5,294,190 | 5/1994 | Feldman et al. | 303/3 |

FOREIGN PATENT DOCUMENTS

| 0067923 | 12/1982 | European Pat. Off. . |
| 1333341 | 10/1973 | United Kingdom . |
| 2131508 | 6/1984 | United Kingdom . |
| 2196074 | 4/1988 | United Kingdom . |
| 2249147 | 4/1992 | United Kingdom . |

*Primary Examiner*—Lee Young
*Attorney, Agent, or Firm*—Leydig, Voit & Mayer, Ltd.

[57] ABSTRACT

A braking system for a vehicle, having a transducer capable of responding to a fluid pressure brake demand signal to provide an electrical brake demand signal to an electronic control means which is responsive to the electrical brake demand signal to provide an electrical brake operating signal. The electrical brake operating signal is supplied to an electrically operable valve means which is arranged to supply a fluid pressure brake operating signal from a source of fluid under pressure to control a supply valve which supplied fluid from the source to at least one actuator for brake application under a brake pressure determined in accordance with the electrical brake operating signal. An electrically operable fluid pressure brake demand signal control valve controls the supply of the fluid pressure brake demand signal to the supply valve as a substitute for the fluid pressure brake operating signal originating from the source.

26 Claims, 12 Drawing Sheets

BRAKING SYSTEMS

This is a continuation of application Ser. No. 08/113,213 filed on Aug. 27, 1993, now abandoned.

BACKGROUND TO THE INVENTION

This invention relates to a braking system for a trailer vehicle.

The requirements for controlling the brakes of vehicles, particularly of heavy duty commercial vehicles, have become increasingly complex in recent times. One such requirement is that of providing an anti-lock braking system (ABS), in which locking or incipient locking of one or more braked wheels is detected and the braking level controlled to avoid such locking. Hitherto the control mechanism for heavy duty vehicle braking systems has usually been based on pneumatic control logic, when the medium which powers the brakes is air under pressure, but increasingly complex requirements for braking control lead to the adoption of an electronically controlled braking system (EBS).

When the vehicle is a trailer or semi-trailer, both herein referred to for convenience as a trailer, it may be drawn by a tractor which has an electronically controlled braking system or one which has a pneumatically controlled braking system. Although it would be desirable to provide a trailer with an electronically controlled braking system, if it is thus provided the system must be compatible for use with a tractor not having an electronically controlled braking system.

It is the object of the present invention to provide an electronically controlled braking system for a vehicle, particularly, but not exclusively, for a trailer, which meets the above requirement for compatibility.

SUMMARY OF THE INVENTION

According to one aspect of the present invention, we provide a braking system for a vehicle, comprising transducer means capable of responding to a fluid pressure brake demand signal to provide an electrical brake demand signal; electronic control means responsive to an electrical brake demand signal; and brake valve means responsive to a brake operating signal supplied to the brake valve means by the electronic control means; said brake valve means being arranged to supply fluid from a source thereof to at least one actuator for brake application under a pressure (herein termed the brake pressure) determined in accordance with said brake operating signal.

The vehicle may be a trailer provided with a supply coupling for connection to a fluid source on the tractor vehicle and an electrical coupling for connection to a stop light and/or continuous electrical supply on the tractor vehicle.

The trailer may have a demand signal coupling for connection to a fluid pressure brake demand signal supply on a tractor vehicle.

The electronic control means preferably provides an electrical brake operating signal which is supplied to electrically operable valve means which may be provided in or in association with the brake valve means. The electrically operable valve means may provide a fluid pressure brake operating signal to a supply valve means which supplies said fluid to said at least one brake actuator in accordance with the value or the fluid pressure brake operating signal.

The electrically operable valve means which is responsive to the electrical brake operating signal may comprise two solenoid valves of which a first is operable between conditions in which it respectively provides for and prevents supply of fluid to a second solenoid valve, whilst the second solenoid valve is operable between conditions in which it respectively provides for passage of fluid from the first solenoid valve to provide the fluid pressure brake operating signal to the supply valve means and a second position in which it provides for exhaust of fluid and reduction of the fluid pressure brake operating signal may be to zero.

With such arrangement of two solenoid valves, as described hereafter in relation to the embodiments shown in the drawings, it is possible by suitably relating the energisation of the solenoids of the two solenoid valves to arrange for braking to be controlled stepwise between a condition of brake application in which the two valves are in their first conditions, a brake holding condition in which the first solenoid is in said second condition and the second solenoid is in said first condition and release of braking in which the two valves are in their second conditions.

The solenoid valves may be arranged so that, in a first case, when energised, the first valve assumes its second condition above referred to, to provide for no braking and when de-energised the first valve assumes said first condition to provide for braking when combined with suitable energisation/de-energisation of the second valve respectively, as in the first and one operating mode of the fifth embodiment described hereafter. In a second case, as in the second, third, fourth and another, preferred, operating mode of the fifth embodiments described hereafter no braking is provided when both solenoid valves are not energised.

In the preferred operating mode of the fifth embodiment an electrically operated valve means may be provided to interrupt feed of fluid to the electrically operable valve means when the transducer means detects absence of a fluid pressure brake demand signal.

In the first case, an electrical supply is required to the braking system at least whilst the vehicle is operating normally, i.e. whilst the vehicle is unbraked, whilst in the second case an electrical supply is only provided to the braking system during braking. In the second case, the electrical supply for the system may be derived from an electrical circuit of a tractor which is only energised during braking, e.g. the stop light circuit thereof.

In the first case, any failure of electrical power supply will permit brake application.

In a first alternative of the first case (as in the first embodiment), means may be provided to feed fluid from said source to said electrically operable valve means both when the electrical supply is present and when it has failed. Said means may comprise a passage in open communication between the source and the electrically operable valve means at least in the direction of the source. In this case full brake application occurs automatically without driver control In a second alternative of the first case (as in the one operating mode of the fifth embodiment), the system may include electrical emergency supply means to feed fluid from said source to said electrically operable valve means when the electrical supply is present and to interrupt said feed of fluid when the electrical supply is not present and demand signal supply means for supplying the fluid pressure brake demand signal to the supply valve means via the electrically operable valve means. In case of electrical failure, this enables graduated braking to be provided directly in response to the fluid pressure brake demand signal without the intervention of the electrical elements of the system.

More particularly, the system may include a demand signal control valve provided in a passage to feed fluid from said source to the electrically operable valve means to act on the fluid from said source, and there being an (upstream) shuttle valve upstream of the electrically operable valve means having a first inlet connected to a passage for the demand signal, a second inlet connected to said passage from said source and an outlet connected to the electrically operable valve means, whereby when the demand signal control valve restricts supply of the fluid from the source the upstream shuttle valve permits the demand signal to flow to the electrically operable valve means whilst when the demand signal control valve permits less restricted or free supply of fluid from the source, the shuttle valve prevents the demand signal from flowing to the electrically operable valve means.

In the second case, any failure of the electrical power supply will not cause automatic brake application and there is preferably provided electrical emergency supply means for detecting such failure of power supply and giving a warning to a driver of the tractor if this occurs.

In the second case, the system may include demand signal supply means for supplying the fluid pressure brake demand signal to the supply valve means (controlling the supply of fluid from the source thereof to the at least one brake actuator).

The demand signal supply means may provide an electrical emergency supply means and comprise an electrically operable demand signal control valve which, in a first state, for example, in the presence of an electrical signal indicating the presence of the electrical supply, prevents supply of the brake demand signal to the supply valve means and, in a second state, for example, in the absence of an electrical signal indicating the presence of the electrical supply, permits supply of the brake demand signal to the supply valve means.

In a first alternative of the second case, as in the second, third and fourth embodiments, the demand signal control valve may be provided in a passage for the demand signal; and act directly thereon A (downstream) shuttle valve may be provided downstream of the electrically operable valve means, having a first inlet connected to the electrically operable valve means, a second inlet connected to the demand signal control valve and an outlet connected to the supply valve means.

In a second alternative of the second case, as in the preferred operating mode of the fifth embodiment, the demand signal control valve may be provided in a passage to feed fluid from said source to the electrically operable valve means to act on the fluid from said source, and there being an (upstream) shuttle valve upstream of the electrically operable valve means having a first inlet connected to a passage for the demand signal, a second inlet connected to said passage from said source and an outlet connected to the electrically operable valve means, whereby when the demand signal control valve restricts supply of the fluid from the source the upstream shuttle valve permits the demand signal to flow to the electrically operable valve means whilst when the demand signal control valve permits less restricted or free supply of fluid from the source, the shuttle valve prevents the demand signal from flowing to the electrically operable valve means.

The supply valve means responsive to the fluid pressure brake operating signal preferably comprises one or more relay valves but may comprise one or more in-line valves.

Means for controlling the fluid pressure brake operating signal may be provided and arranged to operate to provide an anti-lock braking function.

The electronic control means may, in order to provide an ABS function, be responsive to a means for detecting wheel locking or incipient wheel locking so that said electrical brake operating signal is controlled to prevent wheel locking from occurring or being maintained. The electronic control means may also be responsive to one or more other vehicle operating parameters, e.g. vehicle weight as may be detected by one or more sensors operatively associated with a suspension system of the vehicle.

In one more specific aspect of the invention:

The system may be a multi-channel system and may comprise a plurality of brake valve means, the electronic control means providing a plurality of separate electrical brake operating signals for said brake valve means.

The electronic control means may be provided with inputs from a plurality of wheel speed sensors and provide a plurality of ABS brake operating signals as well as a plurality of EBS brake operating signals.

The electronic control means may be provided as a discrete unit separate from and electrically connected to the brake valve means.

In a second more specific aspect of the invention:

The system may be a single channel system and may comprise a single brake valve means, the electronic control means providing a single brake operating signal for the brake valve means.

The electronic control means may be provided with an input from at least one wheel speed sensor and provide a single ABS brake operating signal as well as a single EBS brake operating signal.

The electronic control means may be provided as a discrete unit separate from and electrically connected to the brake valve means.

Alternatively, the electronic control means may be integrated with the brake valve means and preferably mounted within a common housing therewith.

As an alternative to arranging for the electronic control means which is responsive to the electrical brake demand signal to provide an ABS function, the electronic control means may provide an EBS brake operating signal alone and a further electronic control means, herein termed the ABS control means, may be provided. The ABS control means may provide an ABS signal which causes an intermediate fluid pressure brake operating signal to be modified in accordance with ABS requirements so that the fluid pressure brake operating signal which finally determines brake pressure includes an ABS signal component.

In a third more specific aspect of the invention:

The system may be a multi-channel system and may comprise a single brake valve means, the electronic control means providing a single electrical brake operating signal for the brake valve means, and the brake valve means providing a plurality of intermediate brake operating signals, a plurality of ABS supply valves to which said intermediate fluid pressure brake operating signals are supplied so as to cause the intermediate fluid pressure brake operating signal to be modified by each ABS supply valve in accordance with ABS requirements.

The ABS supply valves may comprise solenoid operated relay valves.

The ABS supply valves may comprise solenoid operated in-line valves.

The electronic control means may be integrated with the brake valve means and preferably mounted in a common housing therewith and the ABS control means may be provided as a discrete unit.

The electrically operable valve means and the supply valve means may be provided as an integrated unit and preferably within a single housing.

The electronic control unit may be provided separately from said integrated unit.

Alternatively, the electrically operable valve means may be provided separately from the ABS supply valve or valves.

In this case the electronic control unit having EBS function may be integrated with said electrically operable valve means and preferably within the same housing.

Further alternatively, the electrically operable valve means may be provided separately from the supply valve means.

In this case the electronic control unit having EBS function and ABS function may be integrated with said electrically operable valve means and preferably within the same housing.

Further alternatively, the electronic control unit may be integrated with the electrically operable valve means and the supply valve means in said integrated unit and preferably within said single housing. The electronic control unit preferably provides both EBS and ABS functions but where a multi-channel system is provided at least some channels of the ABS function may be provided by further electronic control units which may be integrated in the above mentioned integrated unit and may be integrated with said electronic control unit.

The system may include a reservoir for fluid under pressure, arranged to be supplied from a tractor and providing said source of fluid for supplying to the at least one brake actuator.

The system may include means arranged to detect any failure of supply of fluid from the tractor to said reservoir and operable to cause brake application in the event of any such failure.

Failure of supply of fluid pressure may be determined by a transducer means responsive to said fluid pressure falling below a predetermined level to provide an electrical pressure failure signal to the electronic control means, the electronic control means being responsive to the pressure failure signal to provide an electrical brake operating signal to the brake valve means to supply fluid from said reservoir to said at least one actuator.

Preferably the electronic control means causes said brake valve means to supply brake pressure in a controlled manner.

Alternatively, failure in the supply of fluid pressure may be detected by a pressure sensitive, emergency transducer valve, the valve being responsive to said fluid pressure falling below a predetermined value to direct fluid pressure from said reservoir to said at least one actuator.

The emergency transducer valve may be provided separately from the integrated unit of electrically operable valve means and supply valve means, or integrated therewith and preferably housed within a common housing.

In the second alternative of the second case where the system is provided with said upstream shuttle valve, a second shuttle valve is provided having a first inlet connected to the demand signal control valve, a second inlet connected to said emergency transducer valve and an outlet connected to the second inlet of the upstream shuttle valve whereby fluid may by-pass the demand signal control means when the emergency transducer valve directs fluid pressure from said reservoir responsive to said fluid pressure falling below a predetermined value.

In the first alternative of the second case where the system is provided with said downstream shuttle valve, a second shuttle valve may be provided having a first inlet connected to the demand signal control valve, a second inlet connected to said emergency transducer valve and an outlet connected to the second inlet of the downstream shuttle valve.

The electronic control means may have an electrical brake demand signal input for connection to an outlet for such a signal on a tractor, if such an outlet is provided on a tractor equipped with EBS. In this case the transducer means of the system according to the invention would remain unused, but would of course be available for use if the trailer is connected to a tractor not having EBS.

The system may comprise a plurality of modules, one module providing said electronic control means, a second module providing an emergency supply valve means and at least one third module providing said electrically operable valve means.

According to another aspect of the invention, we provide a trailer having a braking system comprising electronic control means responsive to an electrical brake demand signal, and brake valve means responsive to a brake operating signal supplied to the brake valve means by the electronic control means; said brake valve means being arranged to supply fluid from a source thereof to at least one actuator for brake application under a brake pressure determined in accordance with the brake operating signal.

Any one or more features of a system according to the first aspect of the invention may be provided in a trailer according to the first aspect of the invention.

BRIEF DESCRIPTION OF THE DRAWINGS

The invention will now be described by way of example with reference to the accompanying drawings, of which.

DESCRIPTION OF THE PREFERRED EMBODIMENTS

Figure 1:
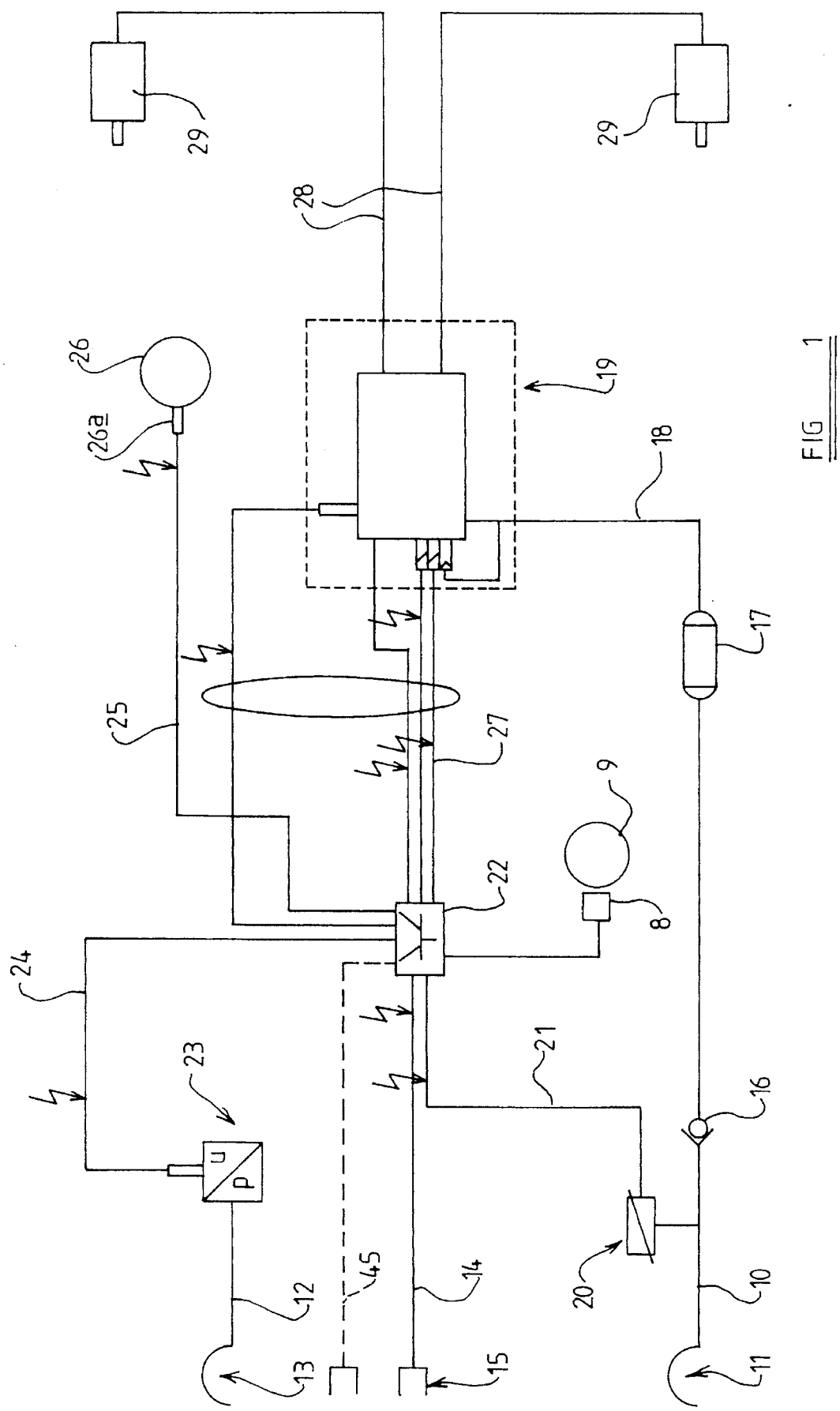
FIG. 1 is a diagrammatic illustration of a trailer braking system.

Each of the braking systems described hereafter is intended to be applied to a trailer for connection to a tractor. It will be assumed that the tractor has, whether it is equipped with an electronically controlled braking system or a pneumatically controlled braking system, an air pressure system which will normally include a compressor and a reservoir for air at full system pressure, and an outlet for supply of such air to the trailer by way of a releasable fluid connector. Further the system includes an outlet for air at a pressure which represents the level of braking demanded of the brakes of the trailer. This outlet from the tractor, also with a releasable connector, will herein be referred to as providing the fluid pressure brake demand signal. The tractor may also provide an electrical supply which is permanently "on", and/or a supply which is "on" only during braking as may be intended to power the brake lights of the trailer.

In the drawings, lines to which the symbol ƒ is applied represent electrical connections between the components described. Lines without such symbol represent pipes for transmission of fluid under pressure, which fluid in the embodiments described hereafter is air.

Figure 2:
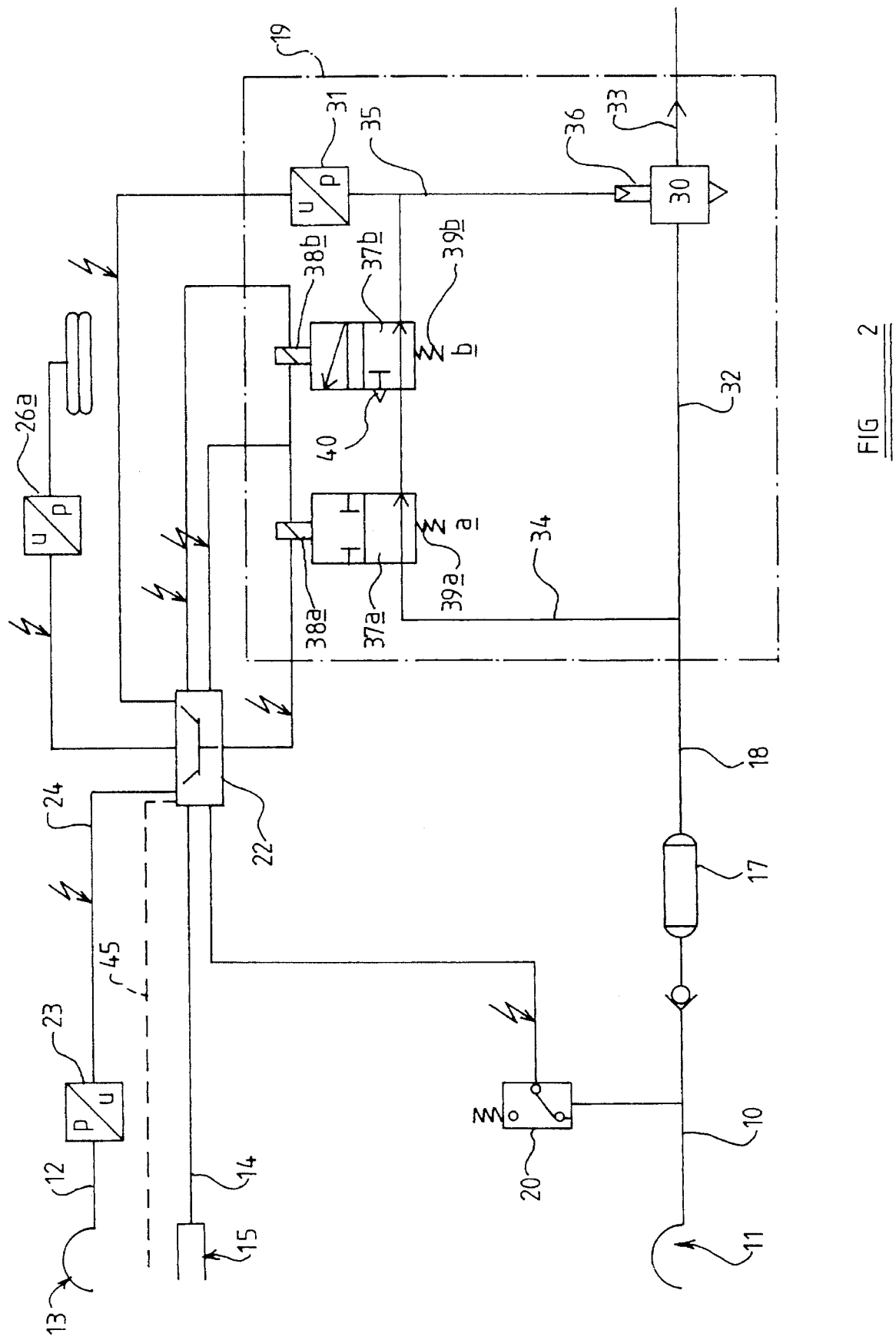
FIG. 2 is a more detailed illustration of part of the braking system of FIG. 1.

Referring firstly to FIGS. 1 and 2 of the drawings, these show a first embodiment of braking system according to the invention. The system has three connections to the tractor, namely a pipe 10 and detachable connector shown diagrammatically at 11 for receiving air under full system pressure from the air pressure system of the tractor, a pipe 12 and detachable connector 13 for receiving the fluid pressure brake demand signal from the tractor, and an electrical line 14 and detachable connector 15 for providing the system with electrical power from the permanently-on electrical outlet of the tractor. The air supply pipe line 10 extends, by way of a non-return valve 16, to a reservoir 17 and the reservoir supplies air through a line 18 to a brake valve means indicated generally at 19 in FIG. 1. All the components described hereinafter and which are shown within the broken line in FIGS. 1 and 2 are preferably mounted together as a discrete unit and preferably within a single housing. Before the non-return valve 16, a pressure switch 20 is branched off the line 10 to act as an emergency fluid transducer means and respond to the pressure of air supplied to the trailer from the tractor and provide an electrical signal if such pressure should fall below a predetermined value, e.g. if the connector 11 should fail. The pressure switch 20 is connected by an electrical line 21 to a main electronic controller unit 22. The controller 22 is supplied with electrical power by way of the line 14. The pipe 12 to which is supplied the fluid pressure brake demand signal from the tractor leads to a transducer 23 which provides an electrical output, either directly or through the intermediary of, for example, a mechanical element, on the line 24 leading to the controller 22, dependent on the fluid pressure brake demand signal such electrical output being the electrical brake demand signal.

The controller 22 also receives an electrical signal, on line 25, representing the load or part of the load of the vehicle, e.g. the proportion of vehicle load carried by an axle or bogie of the vehicle as represented by the air pressure in an air suspension bellows 26 associated with the axle or bogie, and as detected by a suitable transducer 26a associated with the bellows. If the vehicle has a suspension other than an air suspension, e.g. a suspension using mechanical springs, a vehicle load signal may be derived from a position sensor operable to detect the position of one suspension part relative to another and provide the controller with an electrical signal representing such position.

If the braking system is required to provide an ABS function, the controller 22 may also receive a wheel-speed signal from a sensor 8 at a wheel 9.

The controller 22 has an output by way of a cable 27 to the brake valve means 19. The brake valve means 19 has outlets for air under pressure leading by way of pipes 28 to respective brake actuators 29. The internal components of the brake valve means 19 are shown diagrammatically in FIG. 2 of the drawings.

Referring to FIG. 2, this shows that within the brake valve means 19 the operative components comprise two solenoid valves a and b, a relay supply valve 30 and a pressure/electrical transducer 31. Within the brake valve means 19 the supply of air on pipe 18 from reservoir 17 leads by a passage 32 to the input of the relay valve 30 and the output passage 33 of the relay valve 30 leads to the pipes 28 leading to the brake actuators 29 to provide brake pressure thereto. A passage 34 branching from the passage 32 extends by way of the two solenoid valves a, b in succession to a passage 35 for supplying air, as determined by the operation of the solenoid valves a, b described below, to the transducer 31 and the controlling input 36 of the relay valve 30 to provide a brake operating signal thereto.

The solenoid valve a is shown conventionally as comprising a valve element 37a, operating solenoid 38a and return spring 39a. The arrangement of the ports in the valve element 37a is such that when the solenoid is energised so that the valve element is displaced against the action of spring 39a no connection is provided for flow of air from the passage 34 to the following solenoid valve b. When the solenoid 38a is de-energised, which is the condition illustrated, such a connection is provided. The solenoid valve b also comprises a valve element 37b, operating solenoid 38b and return spring 39b. but the ports in the valve member are configured so that when the solenoid is de-energised in the condition illustrated a passage for flow of air is provided through the valve to the passage 35, while when the solenoid is energised any air under pressure from the passage 35 can exhaust to atmosphere, the exhaust port of the valve being indicated diagrammatically at 40.

The transducer 31 provides an electrical feedback corresponding to the pressure in the passage 35, on line 41, to the controller 22.

The two solenoid valves a and b have their solenoid energised in accordance with electrical signals provided by the controller 22. Normally, when there is no brake application, the solenoid valve 38b of valve a is in the energised condition, so that no connection is provided for flow of air from the passage 34 to the solenoid valve b. Any pressure in passage 35 will previously have been exhausted to atmosphere by energisation of the solenoid of valve b after which valve b remains de-energised, so no brake application will result. If the pressure in passage 35 should rise, e.g. due to thermal expansion of air in the passage, this will be detected by transducer 31 and the controller 22 will cause temporary energisation of valve b to prevent brake application. When brake application is required, de-energisation of the solenoid of valve a will result in the supply of air to the passage 35 and rise of pressure therein to cause the relay valve 30 to pass air from passage 32 to passage 33. The controlling air pressure for the relay valve, in passage 35, is detected by the transducer 31 and fed back to the controller 22 until such pressure reaches a value which represents the level of braking demanded of the brakes of the trailer by the fluid pressure brake demand signal and when it does so the controller causes re-energisation of solenoid valve a while solenoid valve b remains de-energised so that the required pressure in passage 35 is held. Brake application will normally be arranged by the controller 22 so that such operation of the solenoid valves a, b, causes the pressure in passage 35 and hence the pressure applied to the brake actuators through the relay valve 30 to be increased in a stepwise manner compatible with operation of an EBS or EBS and ABS system. When brake application is no longer required, continued energisation of solenoid valve a and the re-energisation of solenoid valve b causes exhaust of air from passage 35 to atmosphere and hence release of the brakes, in a controlled stepwise manner.

If there should be any failure of the electrical supply to the system on line 14, the solenoid valves a and b both become de-energised, provide an electrical emergency supply means and cause an immediate full-power brake application. Any failure of the air supply as detected by the pressure switch 20 will also cause the controller 22 to react and cause brake application in a controlled manner, the braking effort being increased stepwise up to a maximum value, thereby providing a fluid emergency supply means.

It will be appreciated that in a system having the overall scheme above described, the exact configuration of the solenoid valves a, b and their requirements for energisation and de-energisation to cause brake application or release of brakes may be different from that above described.

The controller 22 may receive an electrical brake demand signal directly, as indicated by broken line 45, from the tractor, if the tractor has EBS and the system has a suitable outlet for an electrical brake demand signal. In this case the controller will respond directly to such signal rather than to that provided by transducer 23.

Although a single channel system is illustrated in full line, if desired this embodiment may be utilised in a multi-channel system, for example a two or three channel system. In this case the controller 22 is provided with a desired number of outputs to a corresponding number of brake valve means 19, e.g. two brake valve means 19 for a two channel system and three brake valve means 19 for a three channel system.

Where an ABS function is required, a corresponding number of wheel speed sensors are provided, normally two sensors for each channel, and these wheel sensors provide respective wheel speed signals to the controller 22 which then directs respective outputs away from an appropriate one or plurality of cables 27 to the individual brake valve means 19.

The plurality of brake valve means 19 may be disposed as desired on the trailer. They may be provided with separate supply lines from the reservoir 17 or they may be mounted on a manifold which is supplied with air from the reservoir 17.

Figure 3:
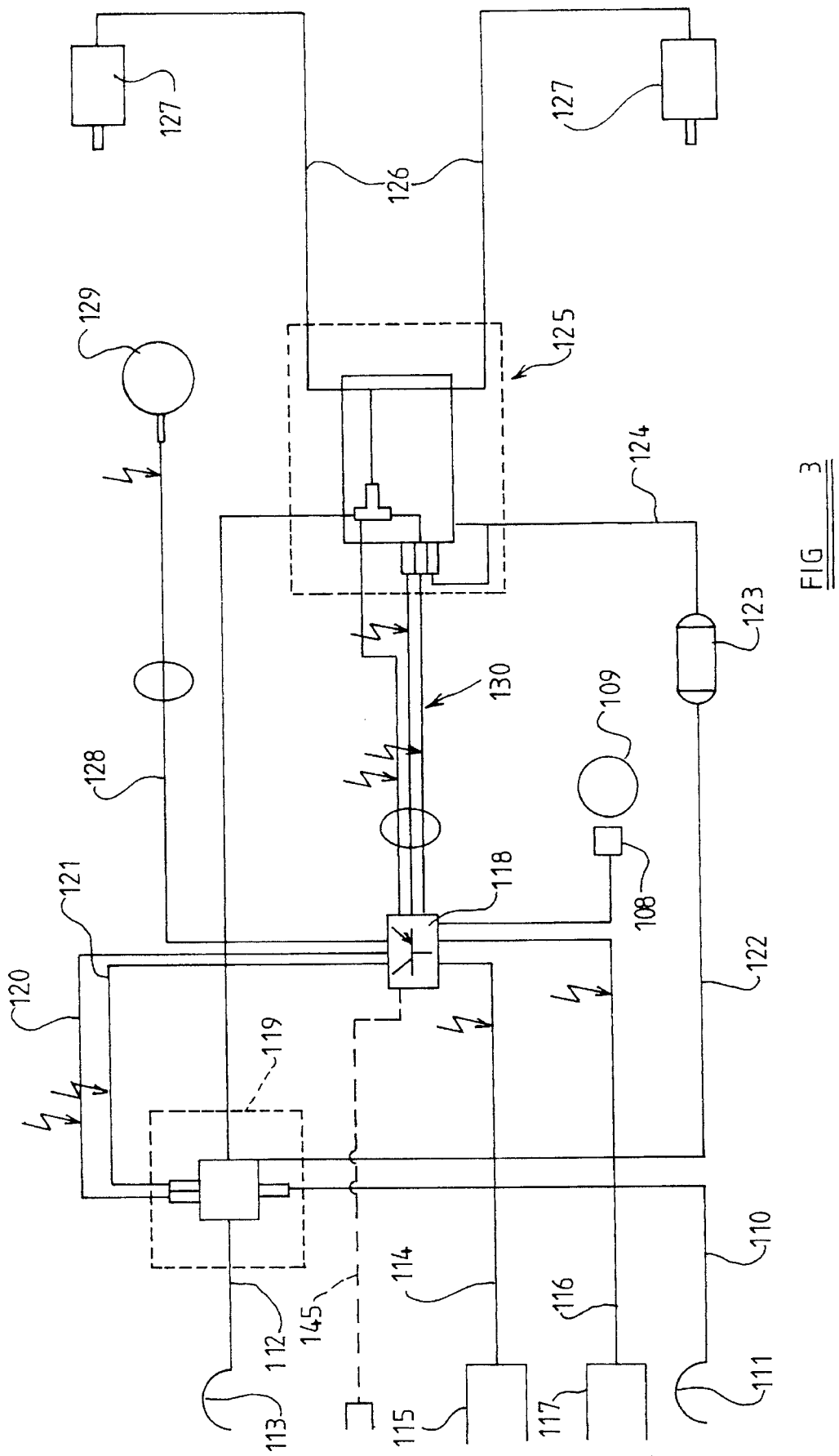
FIG. 3 is a diagrammatic illustration of a first embodiment of braking system according to the invention.
Figure 4:
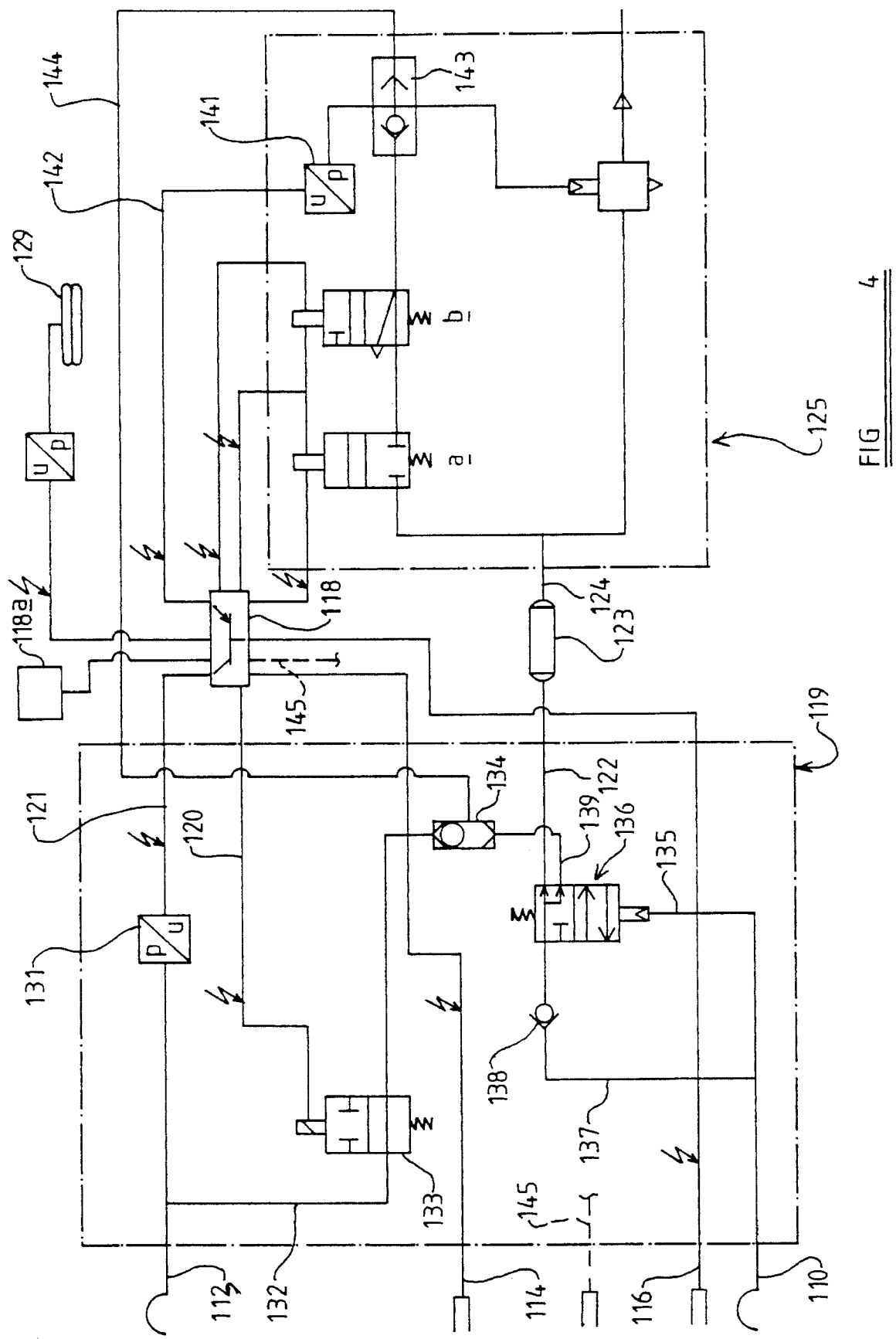
FIG. 4 is a more detailed illustration of part of the braking system of FIG. 3.

Referring now to FIGS. 3 and 4 of the drawings, these show a further embodiment of system according to the invention. FIG. 3 shows the overall layout of the system and FIG. 4 shows part thereof in more detail.

The system in this case has four connections to the tractor, namely a pipe 110 with detachable connector 111 for receiving air under full system pressure from the air pressure system of the tractor, a pipe 112 and detachable connector 113 for receiving the fluid pressure brake demand signal from the tractor, an electrical line 114 with connector 115 for providing the system with electrical power from the permanently-on electrical outlet of the tractor if provided, and an electrical line 116 with connector 117 for providing the system with electrical power when the tractor's brakes are being applied, e.g. from the stop light circuit of the tractor. If the tractor has a permanently-on electrical outlet, the system is preferably powered therefrom, but if not it will be appreciated that the system described hereafter only requires electrical power during braking so it may be powered from the stop light circuit with which all tractors are equipped. The electrical lines 114, 116 lead to an electronic controller 118, while the pipes 110, 112 lead to an emergency transducer valve indicated generally at 119 and whose internal layout is shown in detail in FIG. 4. All the components of the emergency transducer valve 119 described hereinafter and which are shown within the dashed line in FIGS. 3 and 4 are preferably mounted together as a discrete unit and preferably within a single housing. Two electrical lines 120, 121 extend between the transducer valve 119 and the controller 118. Air supply pipe 122 leads from the transducer valve 119 to a reservoir 123 for air at full system pressure, and a pipe 124 supplies such air from the reservoir 123 to a brake valve means indicated generally at 125. All the components of the brake valve means 125 described hereinafter and which are shown within the chain dotted line in FIGS. 3 and 4 are preferably mounted together as a discrete unit and preferably within a single housing. Pipes 126 lead from the brake valve means 125 to supply air at brake pressure to brake actuators 127. The internal components of the brake valve means are also shown in greater detail in FIG. 4 of the drawings. The controller 118 also receives an electrical signal on the line 128 from a pressure transducer associated with air suspension bellows 129, and from a wheel speed sensor 108 for a wheel 109, and communicates by electrical lines 130 with the brake valve means 125.

The emergency transducer valve 119 includes a pressure transducer 131 which is responsive to the fluid pressure brake demand signal provided on pipe 112 and supplies a corresponding electrical signal to the controller 118 on line 121. The fluid pressure brake demand signal is also applied by a passage 132 to a solenoid valve 133 which is closed when energised and open when de-energised. The solenoid valve 133 is energised by an electrical supply on line 120 from the controller 118, and when de-energised and thus open can supply the air, whose pressure represents the brake demand, to a shuttle valve 134. The system air supply on pipe 110 is supplied through a passage 135 to an in-line valve 136 which has a valve member arranged, when moved by the pressure of air supplied through passage 135, to supply system air from a connecting passage 137 and non-return valve 138 to the pipe 122 leading to reservoir 123. When there is no air pressure supply to the in-line valve 136, the valve member thereof assumes the position shown in FIG. 4 in which communication is provided between the pipe 122 and a passage 139 leading to the side of the shuttle valve 134 opposite that to which air can be supplied by way of the solenoid valve 133 whilst passage 137 is closed by non-return valve 138. When the valve member of the in-line valve 136 is in its first mentioned position, the passage 139 leading to the shuttle valve 134 is open to atmosphere.

FIG. 4 also shows in detail the operative components of the brake valve means 125. As for the brake valve means 19 shown in FIGS. 1 and 2, these operative components comprise two solenoid valves a and b following one another, a relay supply valve 140, a pressure transducer 141 supplying a pressure feed back electrical signal to the controller on line 142. Additionally the brake valve means includes a shuttle valve 143 which has a valve element movable between opposed valve seatings respectively associated with a passage leading from the solenoid valve b in the brake valve means and a passage connected to pipe 144 leading from the shuttle valve 134 in the transducer valve 119. The shuttle valve 143 supplies air from whichever of the opposed passages connected to the pipe 144 and solenoid valve b is at higher pressure to the relay valve 140 and pressure transducer 141.

The solenoid valves a and b in the brake valve means 125 differ from the corresponding solenoid valves in the brake valve means 19 of the FIGS. 1 and 2 embodiment in that their valve members are differently configured. When the solenoid of solenoid valve a is energised, the valve permits passage of air whilst when the solenoid is de-energised the valve is closed and passage of air is prevented. The valve member of solenoid valve b provides for passage of air when the solenoid is energised, and when it is de-energised it occupies the position shown in the drawings in which it provides for exhaust of air from the shuttle valve 143 to atmosphere. The normal operative condition of the two solenoid valves a and b when no brakes are being applied is that illustrated, i.e. both solenoids are de-energised.

In normal operating conditions, the in-line valve 136 has its valve member driven by system air to its position other than that illustrated, so that air is supplied to the reservoir 123 while there is no supply of air to the shuttle valve 134, the passage 139 leading to the shuttle valve being exhausted to atmosphere. The controller 118 energises the solenoid of solenoid valve 133 so that such valve is closed. Hence there is no supply of air to the shuttle valve 143 through the pipe 144. The fluid pressure brake demand signal is converted by transducer 131 to an electrical signal supplied to the controller 118, and the controller 118 controls operation of the solenoid valves a and b in the brake valve means 125. When brake application is required, both solenoid valves a and b are energised to cause a stepwise increase in brake operating air pressure at the relay valve 140 so that such valve supplies air proportionately to the brake actuators. When a level of braking is required to be held, solenoid valve a is de-energised while solenoid valve b remains energised, and when the level of braking is required to be reduced solenoid b is additionally de-energised to return to the position shown, the energisation of solenoid b being controlled to produce stepwise reduction of the braking level. During such braking, pressure transducer 141 provides a feedback signal to the controller of the pressure which is operating the relay valve 140, which thus provides a representation of the brake pressure delivered from the valve 140 to the brake actuators.

If there should be any failure of electrical supply to the system, the effect will be the de-energisation of solenoid valve 133 to return it to the position illustrated. Means 118a is provided to give a warning to the driver if this happens, and when the driver applies the brakes the fluid pressure brake demand signal is transmitted to the shuttle valve 134 and thus by way of pipe 144 to the shuttle valve 143. In this condition, the fluid pressure brake demand signal operates the relay valve 140 directly to cause corresponding application of the brakes. The shuttle valve 143 operates automatically during such conditions to prevent exhaustion of air supplied along pipe 144 directly to atmosphere by way of the de-energised solenoid valve b. Thus the valve 133 provides an electrical emergency supply means via the intervention of the warning and the driver.

If there should be any failure of system air supply from the tractor at pipe 110, the in-line valve 136 acts as a pressure sensitive emergency transducer valve and will assume the condition shown in FIG. 4. In this condition it provides a path for flow of air from the reservoir 123 to the shuttle valve 134 and hence through pipe 144 to the shuttle valve 143 and relay valve 140. The effect of this is to cause a full strength brake application. This will occur whether or not such failure of air supply is also accompanied by a failure of electrical supply to the trailer system since the application of system pressure from reservoir 123 to the shuttle valve 134 will override any fluid pressure brake demand signal which might be applied to the shuttle valve 134 if the solenoid valve 133 is in the position illustrated. Thus the valve 136 provides a fluid emergency supply means.

Although a single channel system is illustrated, if desired this embodiment may be utilised in a multi-channel system, for example a two or three channel system. In this case the controller 118 is provided with a desired number of outputs to a corresponding number of brake valve means 125, e.g. two brake valve means 125 for a two channel system and three brake valve means 125 for a three channel system.

Where an ABS function is required, a corresponding number of wheel speed sensors are provided, normally two sensors for each channel, and these wheel sensors provide respective wheel speed signals to the controller 118 which then directs respective outputs away from an appropriate plurality of cables 130 to the individual brake valve means 125.

The plurality of brake valve means 125 may be disposed as desired on the trailer. They may be provided with separate supply lines from the reservoir 123 or they may be mounted on a manifold which is supplied with air from the reservoir 123.

Figure 5:
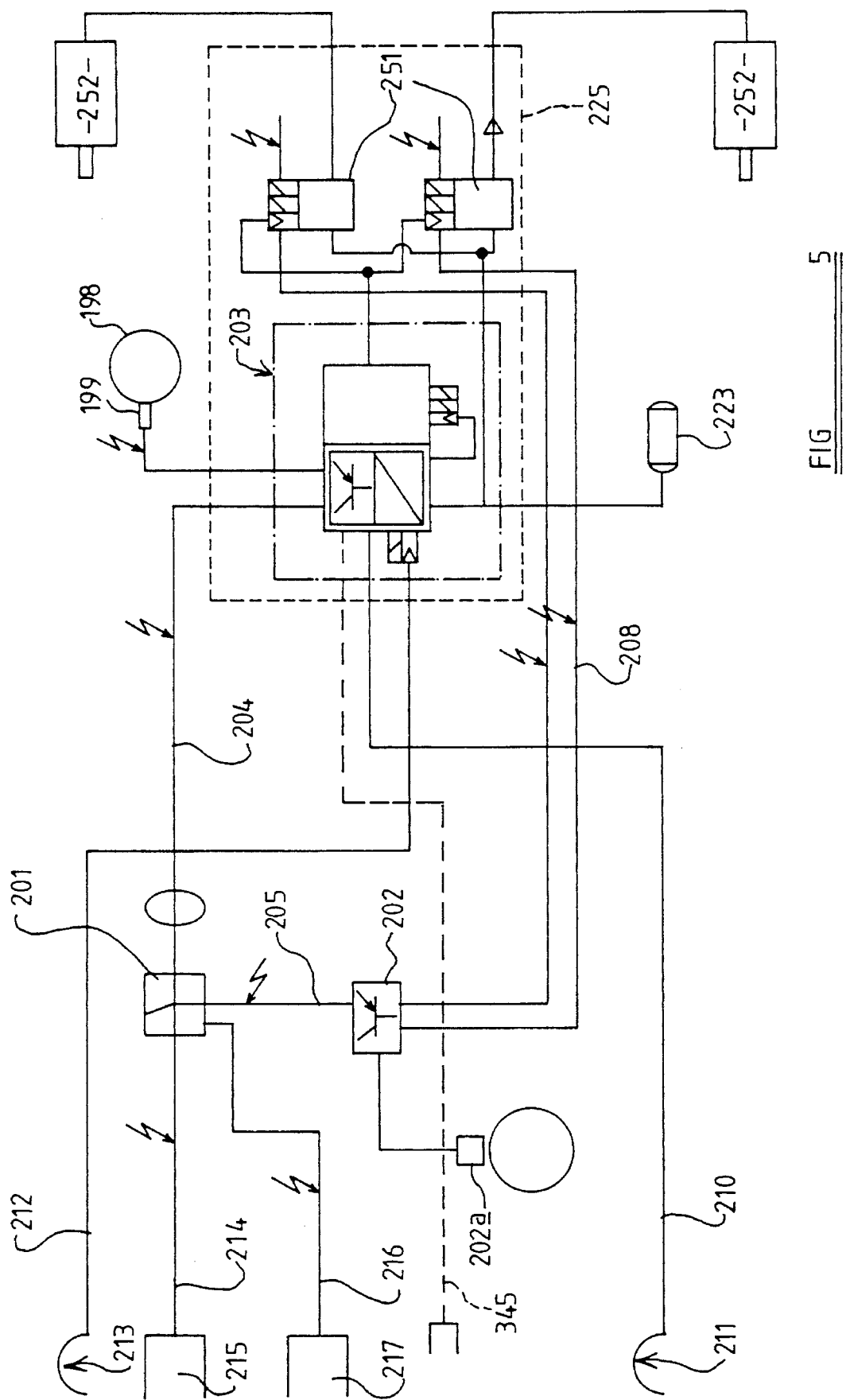
FIG. 5 is a diagrammatic illustration of a further embodiment of braking system according to the invention.
Figure 6:
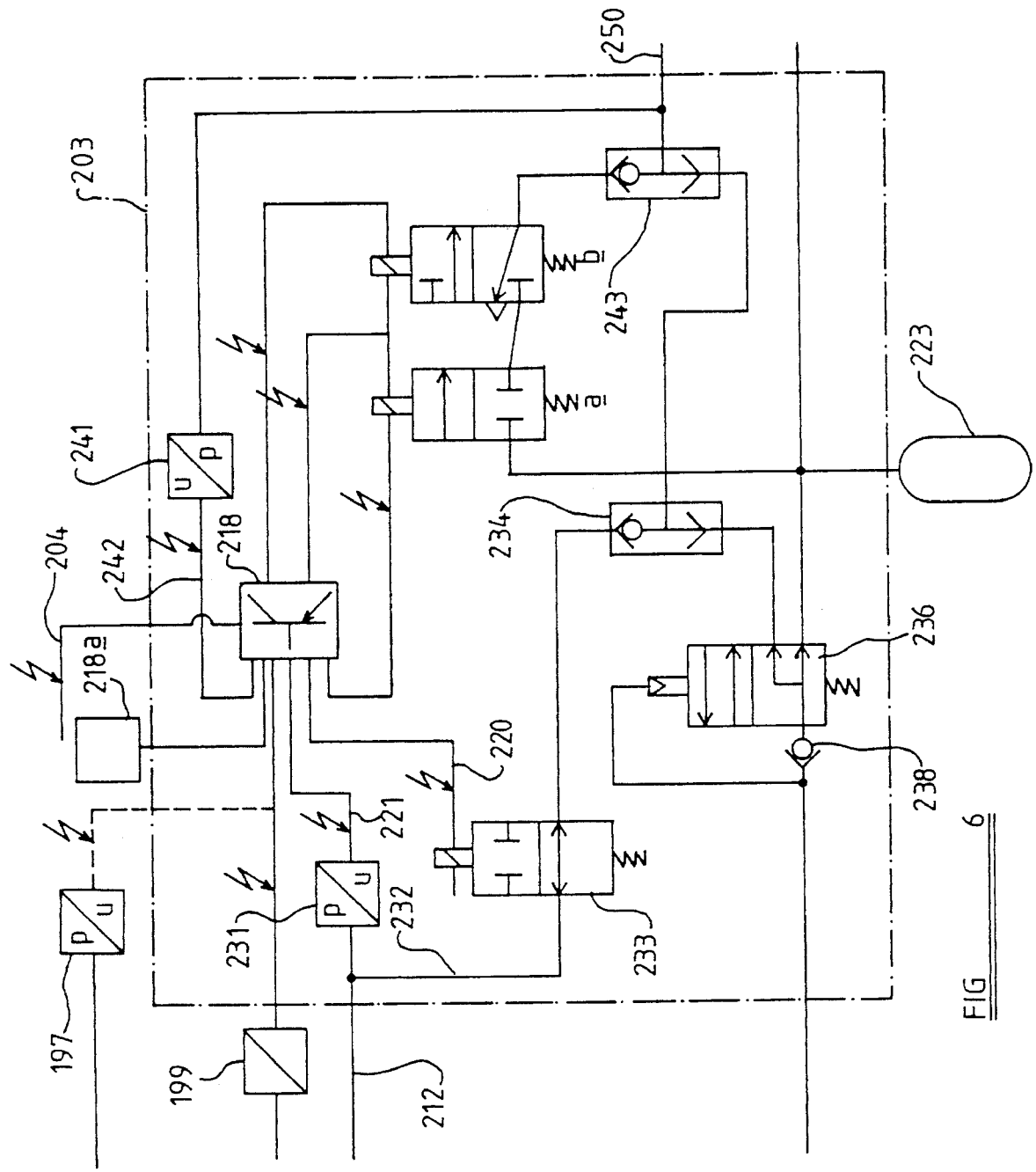
FIG. 6 is a more detailed illustration of part of the braking system of FIG. 5.

Referring now to FIGS. 5 and 6 of the drawings, these show a system which, analogously to the system of FIGS. 3 and 4, has two fluid pressure connections 210, 212 with detachable connectors 211, 213 respectively for system air pressure and the fluid pressure brake demand signal from the tractor. There are also two electrical lines 214, 216 with detachable connectors 215, 217 for alternative connection to the permanently-on electrical supply of the tractor or the electrical supply which is on only during braking. Both electrical supplies extend to a junction box 201 from which lines 204, 205 extend respectively to a brake controller incorporated in a multi-functional valve indicated at 203 in FIG. 5 and to an ABS controller 202. All the components described hereinafter and which are shown within the broken line in FIGS. 5 and 6 are preferably mounted together as a discrete unit and preferably within a single housing.

ABS controller 202 receives wheel speed signals from one or more wheel speed sensors 202a. FIG. 5 also shows that the pipes 210, 212 extend to the multi-function valve 203, and a reservoir 223 for air under system pressure is connected to the valve 221. The multi-function valve 203 is arranged to provide a fluid pressure output at pipe 250, representing an intermediate brake operating signal and this is applied to two ABS relay valves 251 to supply air at brake pressure to respective brake actuators 252. The multi-function valve 203 and the ABS relay valve 251 comprise a brake vale means 225.

Referring now to FIG. 6, this shows in detail the components incorporated in the multifunction valve 203. Many of these components and their inter-relationship with one another are substantially the same as those above described in relation to FIG. 4 of the drawings and operate in analogous manner. Such analogous components are identified by the same reference numerals as used in relation to FIG. 4 but with a preceding '2'. Thus the multifunctional valve includes a main electronic brake controller 218, an in-line valve 236 and adjacent non-return valve 238 operating in the same way as those components in FIG. 4, and a shuttle valve 234. The electronic controller receives a load signal from a transducer 299 associated with air suspension 298, and/or possibly from a transducer 297 for mechanical suspension. The pipe 212 which transmits the fluid pressure brake demand signal from the tractor is connected to a pressure transducer 231 and a solenoid valve 233 which have electrical connections 221, 220 respectively to the controller 208. There are two solenoid valves a and b which are the same as and connected to the controller to operate in the same way as the solenoid valves a and b in the FIG. 4 embodiment, and a shuttle valve 243 which is connected to receive air from the solenoid valves a and b and the shuttle valve 234 in the same manner as the shuttle valve 143 in FIG. 4. There is a pressure transducer 241 which provides a feedback signal to the controller, on line 242, representing the pressure of the output from the multi-function valve at a pipe 250. The intermediate fluid pressure output represented by the pressure in such pipe is applied to the two ABS relay valves 251.

Each of the ABS relay valves 251 comprises a relay valve whose function is to supply air to its respective brake actuator 252 in accordance with the fluid pressure brake operating signal supplied to it. The fluid pressure brake operating signal to which the relay valve responds is the intermediate fluid pressure output from the multifunction valve 203, modified as described hereafter. In addition to a relay valve, each ABS valve 251 has solenoid valves as described hereafter to enable such valves to work with the ABS controller 202 to provide anti-locking brake operation. It is to be understood that the ABS controller 202 will have electrical inputs from speed sensors associated with the respective wheels having the brake actuators 252, and the ABS controller will include electronic circuit means for detecting incipient locking of such wheels and sending instructing electrical signals along lines 208 to the ABS valves.

Figure 7:
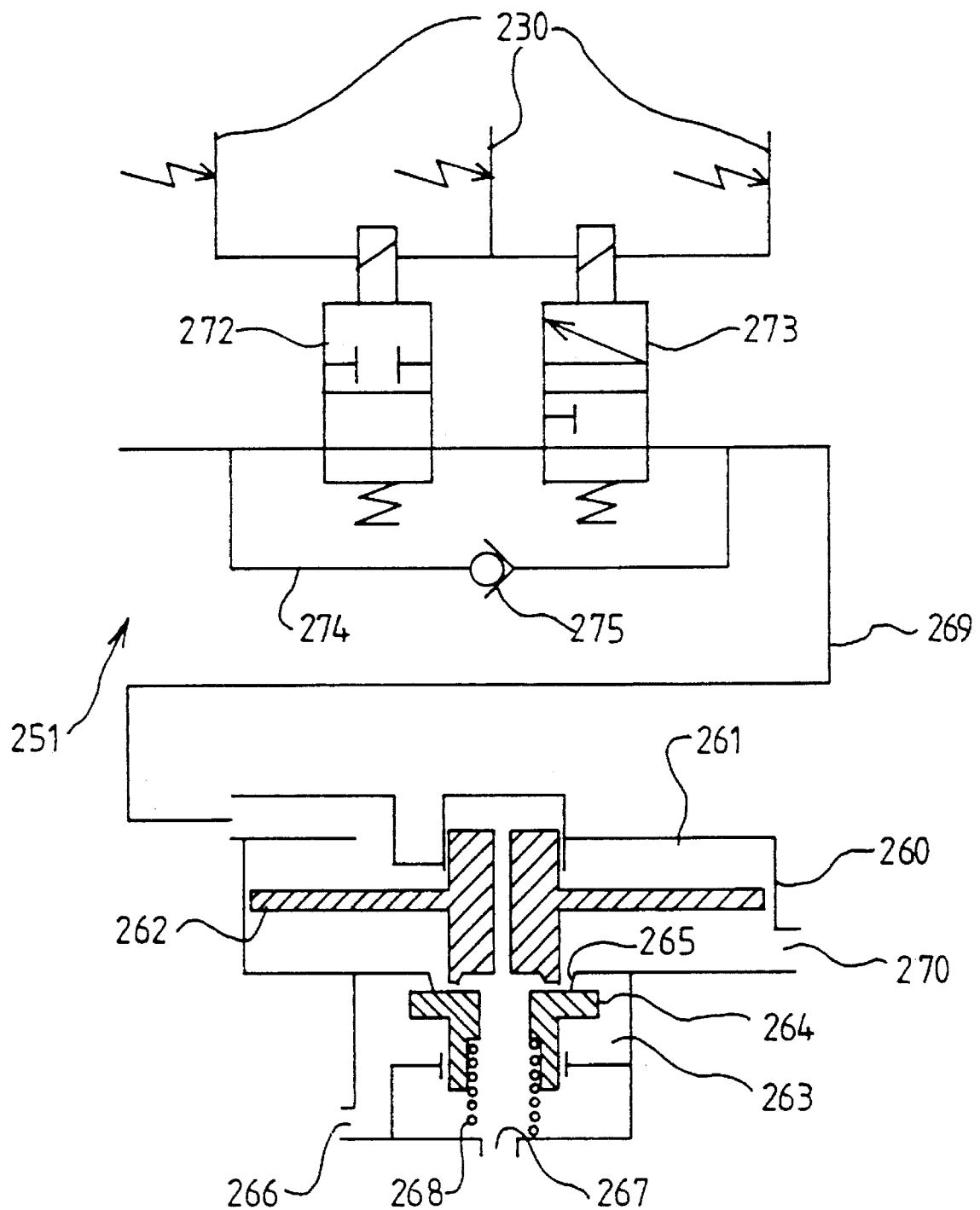
FIG. 7 is a more detailed illustration of part of FIG. 5.

FIG. 7 shows, diagrammatically, the configuration of one of the ABS relay valves 251. It comprises a valve body 260, the upper part of which defines a relatively large diameter cylinder space 261 in which is movable a piston 262. The lower part of the valve body defines a chamber 263 in which is guided an annular valve member 264 which at its upper end has a valve formation engageable with a valve seating 265 surrounding an aperture providing communication between the chambers 263, 261. A connection 266 provides for admission of air from the system reservoir to the chamber 263. Beneath the valve member 264 an opening 267 provides for exhaust to atmosphere of any air which may pass through the centre of the valve member 264. The valve member 264 is spring biased upwardly by a spring 268.

The space in chamber 261 above the piston 262 has supplied to it, through pipe 269, a fluid pressure brake operation signal.

The operation of these components of the ABS relay valve is as follows. When there is no braking action required, no pressure is supplied along pipe 269 and the piston 262 is able to move freely within chamber 261. Valve member 264 is held against seating 265 by the spring 268 and by the pressure of air beneath the valve member. When brake application is required, application of air through the pipe 269 to the space above the piston 262 causes the piston to move downwardly so that a lower extension of the piston contacts the valve member 264 to push the latter away from the seating 265. At the same time, the contact of piston 262 with the valve member 264 prevents any communication through the centre of valve member 264 to the opening 267 exhausting to atmosphere. Air under pressure from the reservoir supplied via connection 266 is able, when the valve member 264 has moved downwardly away from the seating 265, to flow past the valve seating 265 and be supplied through outlet 270 to the associated brake actuator. The brake pressure supplied to the brake actuator is then, by virtue of the arrangement of the operating piston 262, proportional to the brake operating pressure supplied above the piston by way of pipe 269.

The relay valve as above described receives its brake operating signal through pipe 269 by way of two solenoid valves 272, 273 connected to the respective branch of pipe 250 from multifunction valve 203. The solenoid valve 272 has a valve member configured so that when the solenoid of the valve is not energised the valve provides for passage of air through it. When the solenoid of the valve is energised, such passage of air is prevented. The solenoid valve 273 when not energised provides for passage of air through it, and when it is energised it provides for exhaust of air to atmosphere from the downstream side of the valve. The two solenoid valves provide for passage of air successively through them when both are de-energised, and a bypass pipe 274 containing a non-return valve 275 provides for air flow from the downstream side of valve 273 to the upstream side of valve 272, but not for flow of air in the reverse direction.

Under normal braking and when no anti-locking control is in effect the solenoid valves 272, 273 provide for unmodified supply of air to the relay valve through pipe 269. If incipient wheel locking is detected by the ABS controller, solenoid valve 272 will be energised to prevent any increase in air pressure in pipe 269, whilst solenoid valve 273 may be energised to permit any air in pipe 269 to be exhausted to atmosphere thereby reducing the pressure of the brake operating signal applied to the relay valve and thus reducing the braking effect. The normal mode of operation will be to cause braking effect to be changed stepwise.

The solenoid valves 272, 273 providing ABS operation may be configured differently from the illustration. For example, the requirements for valve energisation to cause braking increase or decrease could be arranged differently and/or the port configuration of one or both valves could be different.

Other details of operation, including operating when pressure and/or electrical pressure has failed, are as described in connection with FIGS. 3 and 4.

The embodiment of the invention shown in FIGS. 5, 6 and 7 is advantageous if multichannel ABS is to be provided. In multichannel ABS, more than one wheel of the vehicle has a wheel speed sensor associated with it, and the braking effort provided at individual wheels or axles of the vehicle is controlled in accordance with detection of wheel-locking conditions at the wheels or axles. In this embodiment of the invention, only a single multifunction valve and EBS braking controller needs to be provided, with the intermediate fluid pressure brake operating signal therefrom being supplied to as many ABS relay valves are required for the number of wheels or axles whose ABS braking is to be individually controlled. It would be convenient for the mechanical configuration of the multifunction valve to include an output manifold to which a number of ABS relay valves could be bolted as required. This is an economical construction for multichannel ABS.

Figure 8:
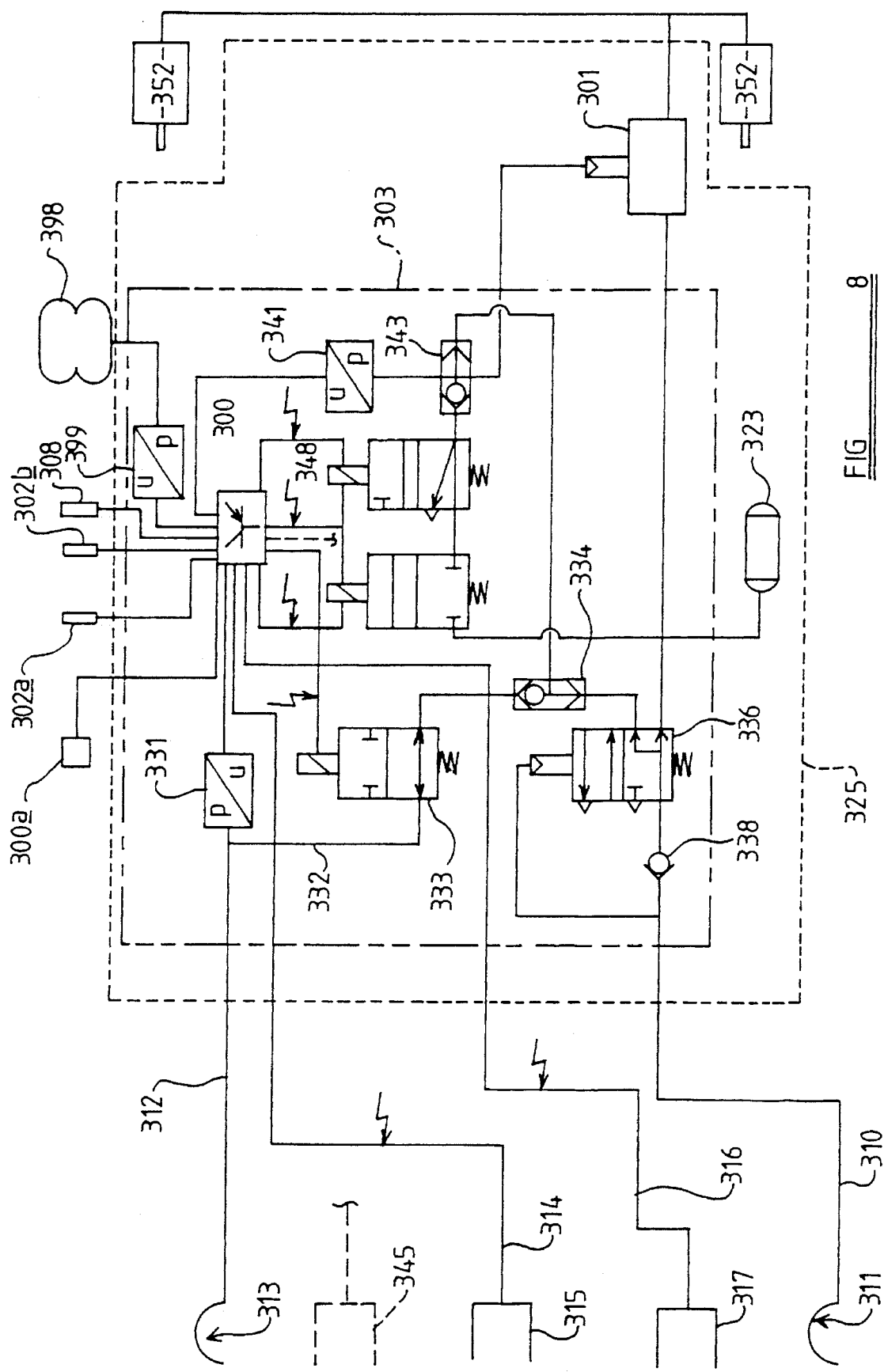
FIG. 8 is a diagrammatic illustration of a yet further embodiment of the invention.

Referring now to FIG. 8, this shows a system similar to that of FIGS. 5 to 7 but specifically adapted for single channel operation. The same reference numerals, but with a preceding '3', are used in FIG. 8 as are used in FIGS. 5 to 7 to refer to corresponding items.

This embodiment differs from that of FIGS. 5 to 7 in that instead of the separate EBS and ABS controllers 218 and 202 of the FIGS. 5 to 7 embodiment, a single combined EBS/ABS controller 300 is provided to which wheel speed signals are supplied from one or more wheel speed sensors, in the present example 2 sensors 302a, 302b.

Consequently the ABS relay supply valves 251 of the previous embodiment are not required and instead a normal relay supply valve 301 is provided. The multifunction valve 303 provides a single fluid pressure brake operating signal, which is dependent on EBS and/or ABS considerations, which is supplied to the supply valve 301 which provides brake pressure to the actuators 352. If desired, the single fluid pressure brake operating signal may be supplied to a plurality of supply valves 301. In other respects this embodiment and its function are the same as in the previously described embodiment except that the multi-function valve 303 provides ABS control as well as EBS control in a manner somewhat analogous to the embodiment of FIGS. 3 to 4, although in that embodiment the controller 118, the emergency transducer valve 119 and the brake valve means 125 are discrete components. The multi-function valve 303 and the supply valve 301 comprises a brake actuating means 325.

Figure 9:
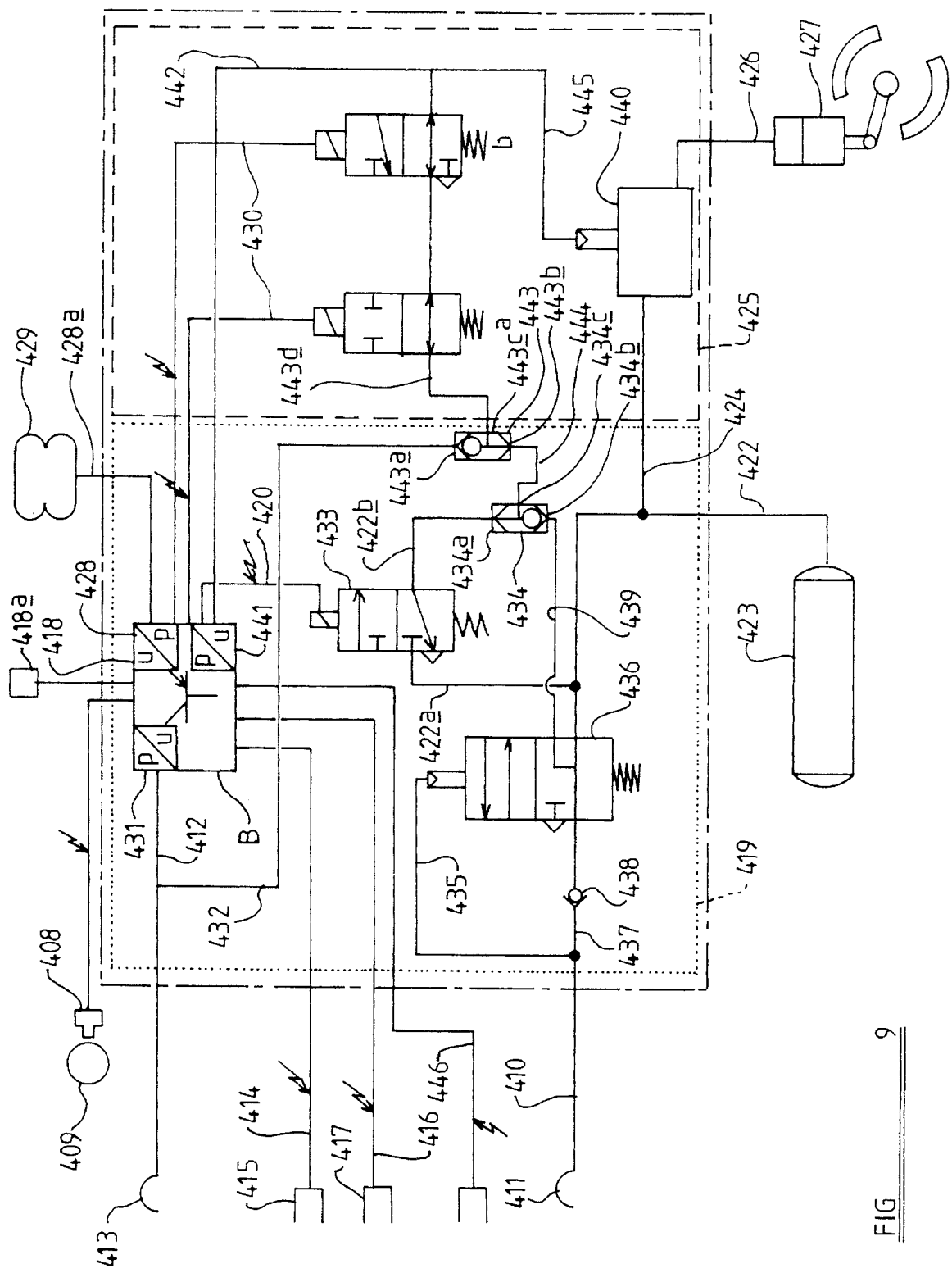
FIG. 9 is a diagrammatic illustration of a yet further embodiment of the invention.

Referring now to FIG. 9 of the drawings, this shows a further embodiment of system according to the invention. In FIG. 9 the same reference numerals but preceded by a '4' are used as are used in FIGS. 3 to 4 to refer to corresponding items.

The system in this case has four connections to the tractor, namely two pipes 410, 412 and two electrical lines 414, 416 corresponding to the connections 110, 112, 114 an 116 respectively of FIGS. 3 and 4, together with respective connectors. The system described hereafter normally is provided with electrical power at all times from the line 414. However, if desired and as hereinafter to be described, the system may be operated using only brake light powering.

The electrical lines 414, 416 lead to an electronic controller 418, while the pipes 410, 412 lead to an emergency transducer valve indicated generally at 419. The components of the emergency transducer valve 419 described hereinafter are shown within the dotted line in FIG. 9.

An air supply pipe 422 leads from the transducer valve 419 to a reservoir 423 for air at full system pressure, and a pipe 424 supplies such air from the reservoir 423 to a brake valve means indicated generally at 425. The components of the brake valve means 425 described hereinafter are shown within the dashed line in FIG. 9. A pipe 426 leads from the brake valve means 425 to supply air at brake pressure to a brake actuator 427. The controller 418 receives an electrical signal from a pressure transducer 428 associated with air suspension bellows 429 by a line 428a. If desired the transducer 428 may be provided closer to the air suspension and be connected electrically to the controller 418. The controller 418 also receives an electrical signal from a wheel speed sensor 408 for a wheel 409, and communicates by electrical lines 430 with the brake valve means 425.

The emergency transducer valve 419 includes a pressure transducer 431, shown associated with the electronic control unit 418 but which may be provided separate therefrom at a desired location and connected to the unit 418 by an electrical line. The transducer 431 is responsive to the fluid pressure brake demand signal provided on pipe 412 and supplies a corresponding electrical signal to the controller 418. The fluid pressure brake demand signal is also applied by a passage 432 to a first inlet 443a of a shuttle valve 443 which is preferably normally biased to the position shown.

The system air supply on pipe 410 is supplied through a passage 435 to an in-line valve 436 which has a valve member arranged, when moved by the pressure of air supplied through passage 435, to supply system air from a connecting passage 437 and non-return valve 438 to the pipe 422 leading to the reservoir 423. When there is no air pressure supply to the in-line valve 436, the valve member thereof assumes the position shown in FIG. 9 in which communication is provided between the pipe 422 and a passage 439 leading to a second inlet 434b of a second shuttle valve 434 the first inlet 434a of which is connected to a solenoid operated demand signal control valve 433 whilst passage 437 is closed by non-return valve 438. When the valve member of the in-line valve 436 is in its first mentioned position, the passage 439 leading to the second shuttle valve 434 is open to atmosphere. The valve 434 is preferably normally biased to the position shown.

A demand signal control valve 433 is open when energised and closed when de-energised. The valve 433 is energised by an electrical supply on line 420 from the controller 418, and when energised, and thus open, can feed supply air to the second shuttle valve 434.

The outlet 434c of the second shuttle valve 434 is connected to a second inlet 443b of the shuttle valve 443.

* The brake valve means 425 comprises two solenoid valves a and b connected in series, connected by a line 445 to a relay valve 440, and a pressure transducer 441 supplying a pressure feed back electrical signal to the controller 418 by virtue of being provided with air on a line 442. If desired, the transducer 441 may be provided closer to, or in, the line 445 and electrically connected to the controller 418. The shuttle valve 443 has a valve element movable between opposed valve seatings respectively associated with the two inlets so that the shuttle valve 443 supplies air from whichever of the inlets which is at higher pressure to the outlet 443c. The shuttle valve 443 is disposed upstream of the valve a and b and will be referred to as the upstream shuttle valve herein. It is connected by a line 443d to the valve a.

The solenoid valves a and b in the brake valve means 425 differ from the corresponding solenoid valves in the brake valve means of the FIGS. 3 and 4 embodiment in that their valve members are configured as in the FIGS. 1 and 2 embodiment.

Normally, when there is no brake application, demand signal control valve 433 is de-energised due to the transducer 431 detecting absence of a brake demand signal on line 412. Hence supply air in line 422a is blocked so that no connection is provided for flow of air from the passage 422a to the solenoid valves a and b. Any pressure in a passage 445 from the valve b to the relay valve 440 will be exhausted to atmosphere via shuttle valves 443, 434 and the valve 433 so no brake application will result.

When brake application is required, energisation of the solenoid of the demand signal control valve 433 will result in the supply of air to the passage 445 and rise of pressure therein to cause the relay valve 440 to pass air from passage 424 to passage 426. The controlling air pressure for the relay valve 440, in passage 445, is detected by the transducer 441 and fed to the controller 418 until such pressure reaches a value which represents the level of braking demanded of the brakes of the trailer by the fluid pressure brake demand signal and when it does so the controller causes energisation of solenoid valve a while solenoid valve b remains de-energised so that the required pressure in passage 445 is held. Brake application will normally be arranged by the controller 418 so that such operation of the solenoid valves a, b, causes the pressure in passage 445 and hence the pressure applied to the brake actuators through the relay valve 440 to be increased in a stepwise manner compatible with operation of an EBS and ABS system. When brake application is no longer required, continued energisation of solenoid valve a and the re-energisation of solenoid valve b causes exhaust of air from passage 445 to atmosphere and hence release of the brakes, in a controlled stepwise manner. When transducer 441 detects atmospheric or near atmospheric pressure in line 445 the controller 418 causes the demand signal control valve 433 and the solenoid valves a and b to be de-energised.

If desired, an alternative but less preferable operating mode may be provided in which instead of relying on the de-energisation of the demand signal control valve 433 to prevent air supply to the brakes, this is achieved by the solenoid valves a and b. In this case, the solenoid valve a is in the energised condition, so that no connection is provided for flow of air from the passage 443d, to the solenoid valve b. Any pressure in a passage 445 from the valve b to the relay valve 440 will previously have been exhausted to atmosphere by energisation of the solenoid of valve b after which valve b remains de-energised, so no brake application will result. If the pressure in passage 445 should rise, e.g. due to thermal expansion of air in the passage, this will be detected by the transducer 441 and the controller 418 will cause temporary energisation of valve b to prevent brake application. When brake application is required, de-energisation of the solenoid of valve a will result in the supply of air to the passage 445 and rise of pressure therein to cause the relay valve 440 to pass air from passage 424 to passage 426. The controlling air pressure for the relay valve 440, in passage 445, is detected by the transducer 441 and fed to the controller 418 until such pressure reaches the required value and when it does so the controller causes re-energisation of solenoid valve a while solenoid valve b remains de-energised so that the required pressure in passage 445 is held. Brake application will normally be arranged by the controller 418 so that such operation of the solenoid valves a, b, causes the pressure in passage 445 and hence the pressure applied to the brake actuators through the relay valve 440 to be increased in a stepwise manner compatible with operation of an EBS and ABS system. When brake application is no longer required, continued energisation of solenoid valve a and the re-energisation of solenoid valve b causes exhaust of air from passage 445 to atmosphere and hence release of the brakes, in a controlled stepwise manner.

In this alternative operating mode since the solenoid a is energised when the brakes are off continuous powering on line 412 is necessary. If desired the demand signal control valve may be continuously energised during normal operation.

In normal operating conditions, the in-line valve 436 has its valve member driven by system air to its position other than that illustrated, so that air is supplied to the reservoir 423 while there is no supply of air to the second shuttle valve 434, since the passage 439 leading to the shuttle valve is exhausted to atmosphere. When the driver demands brake application the fluid pressure brake demand signal is converted by transducer 431 to an electrical signal supplied to the controller 418, and the controller 418 energises the demand signal control valve 433 so that such valve is open to supply air to the shuttle valve 443 and controls operation of the solenoid valves a and b in the brake valve means 125 as described above.

If there should be any failure of electrical supply to the system either total, or just failure of valve 433 or if the valve 433 is rendered inoperative for any other reason whilst the system or emergency air supply on line 410 is maintained, the effect will be the de-energisation of the demand signal control valve 433 to return it to the position illustrated. Means 418a is provided to give a warning to the driver if this happens, and when the driver applies the brakes the fluid pressure brake demand signal is transmitted to the upstream shuttle valve 443 which moves from a normally biased position illustrated due to the absence of supply air at its second inlet 443b, due to line 439 being exhausted to atmosphere by the valve 436 and so the demand signal is fed via the outlet 443c and thus by way of pipe 443d to the solenoid valve a. In this condition, the fluid pressure brake demand signal operates the relay valve 440 directly to cause corresponding application of the brakes. Although on release of the manually applied brake demand pressure the valve member of upstream shuttle valve 443 will be biased to close the inlet 443a, when the pressure falls to a predetermined pressure, the pressure in the control line 445 will still be released due to exhaust of the air via line 444, 422b and valve 433 which is, of course, de-energised. If only valve 433 is inoperable only some EBS failure has occurred ABS function may still be provided by the solenoids a and b. Thus the valve 433 provides an electrical emergency supply means.

If there should be any failure of system air supply from the tractor at pipe 410, the in-line valve 436 provides a fluid emergency supply means and will assume the condition shown in FIG. 9. In this condition it provides a path for flow of air from the reservoir 423 to the second shuttle valve 434 and hence through pipe 444 to the shuttle valve 443. Due to the normally biased condition of the shuttle valve 443 the supply air at the second inlet 443b is fed to the outlet 443c and thence the solenoid a.

If the electrical supply is maintained (but the system air supply fails when braking is demanded) the demand control valve 433 is energised when the brakes are demanded so that supply air from the reservoir 423 is fed via line 422a and the valve 433 to the first inlet 434a of the second shuttle valve 434 as well as being fed via valve 436 and line 439 to the second inlet 434b. Since the valve 434 is normally biased to close the second inlet 434b air will pass to the outlet 434c from the first inlet 434a. The air flows from the outlet 434c to the second inlet 443b of the upstream valve which because of its normally biased condition closes the first inlet 443a and feeds the air from the second inlet 443b to the solenoid a.

Since the electrical supply is maintained the solenoid valves a and b may function in EBS and ABS mode during the brake application.

If the electrical supply is maintained (but the system air supply fails when braking is not demanded) the demand control valve 433 remains in the de-energised position so that supply air is not fed via line 422a and the valve 433 to the first inlet 434a of the second shuttle valve 434. Instead supply air is fed via valve 436 and line 439 to the second inlet 434b and will pass to the outlet 434c. The air flows from the outlet 434c to the second inlet 443b of the upstream valve which because of its normally biased condition closes the first inlet 443a and feeds the air from the second inlet 443b to the solenoid a and since solenoid valves a and b cannot be energised air is passed freely therethrough and the brakes are applied automatically.

If the electrical supply as well as the air supply fails, the demand signal control valve 433 remains, or if braking is already being demanded is, de-energised to prevent flow to the first inlet 434a of the second shuttle valve 434 and air flows via valve 436 and line 439 to the second inlet 434b of the second shuttle valve 434 which, because of exhaust of air in the line to the first inlet 434a by valve 433 permits flow from the second inlet 434b to the second inlet 443b of the upstream shuttle valve and hence to the solenoid a. Since the electrical supply has failed the solenoid valves a and b simply allow free flow of air to the relay valve 440 to apply the brakes and no ABS function is available.

It should be noted that when the driver demands braking under normal conditions, due to the normal bias of the shuttle valve 443, the transduced pressure will show a demand and the valve 433 will be immediately energised to supply air from reservoir 423 to solenoid a. When the demand pressure signal is removed by the driver the solenoid of valve 433 is de-energised as soon as the demand reaches zero and line 422b is exhausted to atmosphere.

If only stop light power is available on the tractor vehicle the demand signal control valve 433 is de-energised whilst braking is not demanded and so under normal air supply conditions no supply air will pass to the solenoid valves a and b.

When braking is demanded, brake light power is available so that when the transducer 431 detects control signal pressure the valve 433 is energised to feed supply air to the valves a and b. Normal EBS and ABS control is available.

If, for any reason EBS and/or ABS function is not required under brake light powering conditions, the demand signal control valve 433 may be arranged not to be energised on brake demand so the system air is blocked by valve 433. In this case demand control signal air is fed to the valves a and b via line 432 and upstream shuttle valve 443 as described above. The valves a and b may provide ABS function if desired.

If it is desired to provide a multi channel ABS facility, two or more in line ABS valves may be provided downstream of the relay valve 440 in the line 426. In this case the valves a and b provide only EBS functions.

Preferably all the components of the emergency transducer valve 419 and of the brake operating valve 425 are mounted together as a discrete unit and preferably within a single housing as illustrated by the chain dotted line in FIG. 9.

It will be noted that, starting from no air supply when the pressure starts to build up, the brakes are applied to the fluid emergency supply valve 436 and the shuttle valves, whilst the pressure is building up at reservoir 423. At a predetermined pressure the fluid emergency supply valve 436 will overcome its spring bias and the brakes will be exhausted to atmosphere, whilst the reservoir continues to be supplied with compressed air. The vehicle is now ready to move away.

In the event of a break in the air supply the fluid emergency supply valve 436 will return to the position shown and full braking will be applied automatically from the reservoir if the system is stop lamp powered. If the system is permanently powered, the driver will still have regulated control and ABS, or the system may be arranged automatically to apply the brakes with ABS control according to local regulation requirements. The electrical emergency supply valve (demand signal control valve) 433 permits stop light operation of the system. When no power is supplied valve 433 is in the position shown and the brakes remain off. When power is supplied, valve 433 may be energised to supply compressed air via the shuttle valves to the solenoid valves a, b for the valves a, b to modulate and supply to the relay valve 440 for brake application. The demand signal control valve 433 also ensures good overall response in that upon energisation it effectively shuts off control air supply at the shuttle valve 443 allowing the control pressure quickly to build up in a "blind pipe". The volume in the pipe between the transducer 431 and shuttle valve 443 is small. Furthermore, it allows a normally off solenoid at a which is good for a high performance solenoid.

If there is an electrical supply failure when the brakes are applied, the electrical emergency supply valve 433 dumps the air in the line between itself and the shuttle valve 434 and allows controlled air from the towing vehicle to be applied through the solenoid valves a, b to the relay valve to make a graduated push-through brake application.

All the pressure transducers 431, 428 and 441 are located on a printed circuit board B and may comprise piezo-electric strain gauge transducers.

Figure 10:
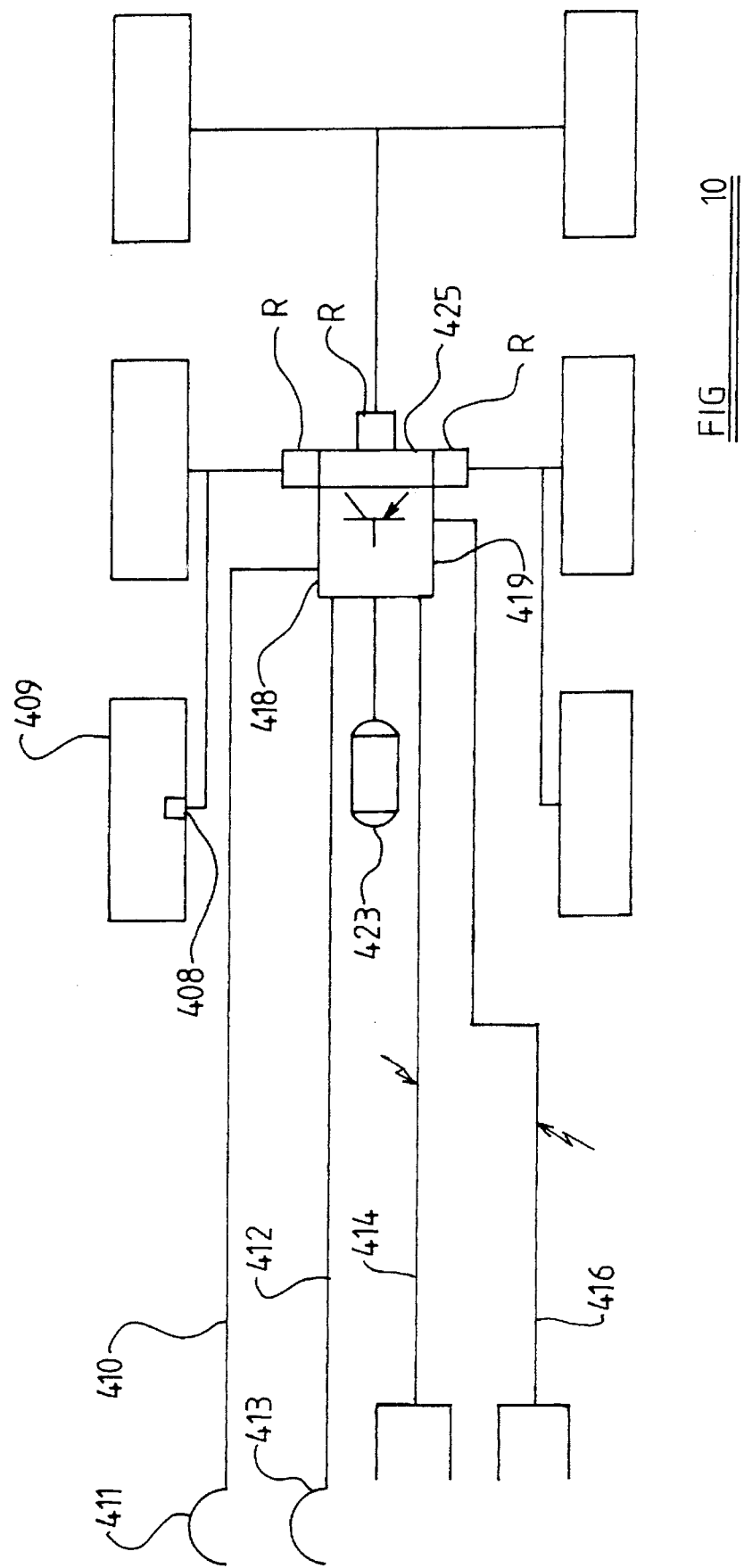
FIG. 10 is a diagrammatic plan view of a trailer having one version of the embodiment of FIG. 9 fitted thereto.

In a 2S/1M system as illustrated in FIG. 9, the solenoid valves a, b not only provide the EBS function, but also the ABS function. As described above, multi-channel ABS may be achieved simply by adding ABS relay valves R downstream of the relay valve 440 shown in FIG. 9. Such a layout is shown in FIG. 10 and is an economical arrangement for 2S/1M systems.

However, the advantages are not perpetuated into higher level systems and a draw-bar version is potentially expensive. Accordingly, in a modification the integrated system shown in FIG. 9 is split into three sub-assemblies or components. The first component is the controller 418, the second is an emergency supply valve ESV and the third an electropneumatic relay valve EPRV.

Figure 11:
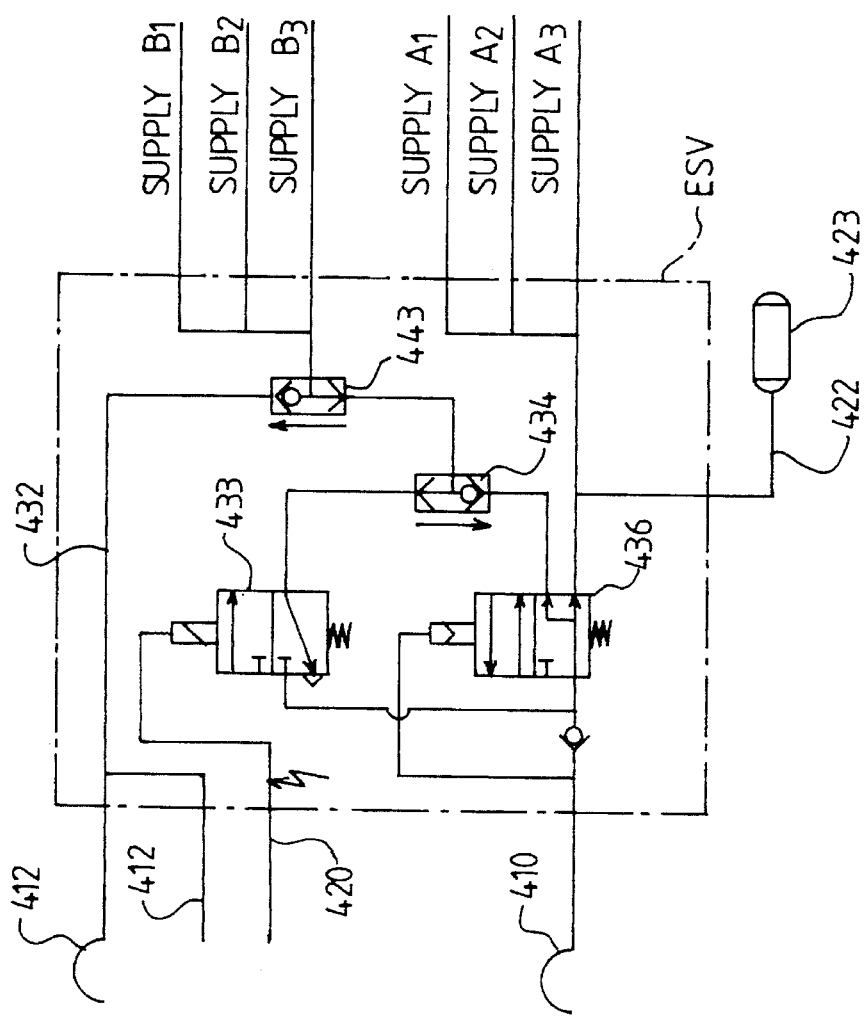
FIG. 11 is a diagrammatic illustration of an emergency supply valve (ESV)

As shown in FIG. 11, the ESV comprises a pressure sensitive fluid emergency supply valve 436, the electrical emergency supply or demand signal control valve 433 and the shuttle valves 434 and 443. These components operate in exactly the same manner as previously described with reference to FIG. 9. The brake demand line 412 and supply lines 410 are brought into this valve and the reservoir supply 422 is also connected to the valve.

The ESV valve is configured to bolt directly to the controller 418 on the one hand and to electromagnetic relay valves on the other hand. Supplies A1-3 and B1-3 are arranged in a manifold in order to cater for up to three electromagnetic relay valves for a 3M system.

Figure 12:
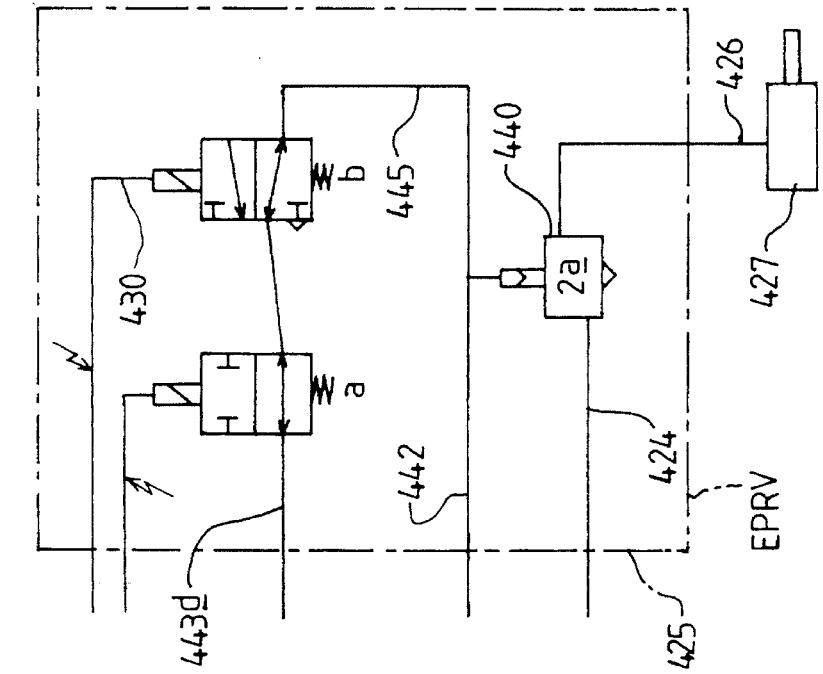
FIG. 12 is a diagrammatic illustration of an electromagnetic relay valve (EPRV).

An EPRV is shown in FIG. 12, it comprises solenoid valves a, b and a relay valve 440, all as described in connection with FIG. 9.

The EPRV's normally operate as an EBS relay valve when they are mounted with their feedback port connected, e.g. clamped, to the transducer 441 of the controller 418. When they are mounted remotely the feedback port can be closed off and they can operate as a simple ABS valve.

Figure 13:
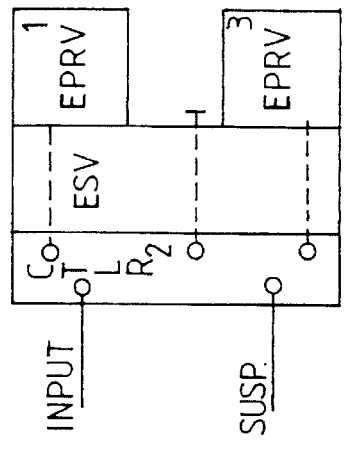
FIGS. 13 to 16 are diagrammatic illustrations of four applications of the invention to a trailer.

Two versions of the controller 418 may be provided. A controller CTLR1 for a 2S/1M system is a simplified version containing the minimum three transducers 431 428 and 441, as described above. It is designed so that whilst it bolts to the ESV it receives feedback air directly from the EPRV as shown in FIG. 13.

Figure 14:
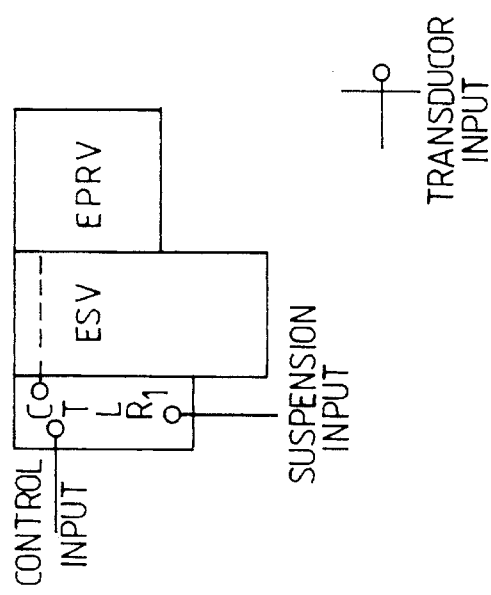
Figure 15:
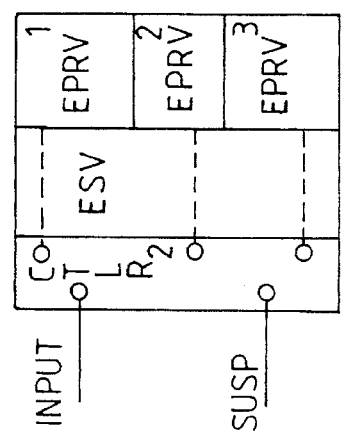
Figure 16:
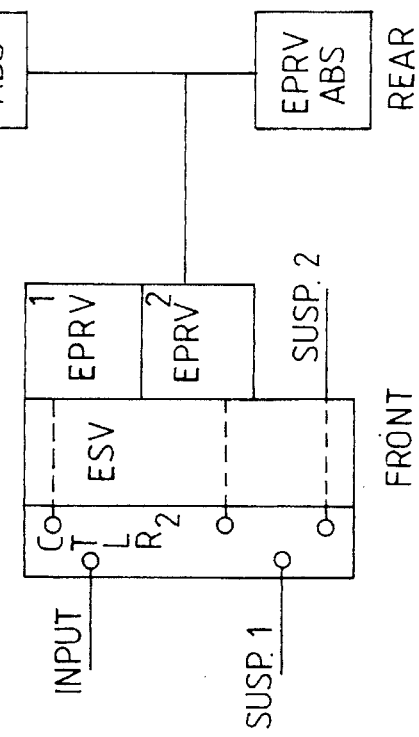

A larger controller is shown at CTLR2 in FIGS. 14–16 and contains five pressure transducers, namely transducers 431 and 428 and three feedback transducers 441. The controller CTLR2 is arranged so that it is mounted directly to the ESV, to provide a direct channel to each EPRV for pressure feedback purposes.

The ESV in 2S/1M form may not have certain galleries drilled in order to save cost. All transducers are situated on a single printed circuit board in order to save cost.

Referring to FIG. 14, the 2S/2M system is produced by the utilisation of 2—2 port EPRV's, the third channel feedback port to the controller being blocked. A 3M system is obtained simply by bolting on a further EPRV as shown in FIG. 15.

A further system advantage is obtained in the case of a full or draw-bar trailer. As shown in FIG. 16, EPRV1 works normally as an EBS valve for the front axle, but EPRV2 functions only as an EBS valve without ABS control. It therefore supplies air to the rear of the trailer where a further pair of EPRV's, working in ABS mode only, control the rear brakes. Conveniently, the rear air suspension may be transduced from the same port as that used normally by the third EPRV.

In each system described above, the brake controller 22, 118, 218, 300, 418 may receive a vehicle load signal. The controller will be responsive to such load signal to determine the level of braking provided by the system relative to the magnitude of the brake demand signal it receives. Thus the controller in the system also assumes the function of a load sensing valve which is commonly provided in a fluid pressure braking system.

In any of the embodiments decribed above, if desired an EBS electrical control input line 145, 245, 345, 446 may be provided to connect the controller 22, 118, 218, 300, 418 to an EBS electrical output line of the tractor so that, if desired, EBS control from the tractor may be provided. In this case the above described embodiments, where an electrical input to the controller 22 etc. is generated by a pressure transducer in the pneumatic brake demand signal line, may provide back up braking should the EBS signal from the tractor not be available or fail on the tractor or the trailer or at the connection therebetween.

The shuttle valves 434, 443 comprise conventional shuttle valves in which a valve member is normally biased into sealing engagement with one valve seat of one inlet but can be moved against the bias into sealing engagement with another valve seat of a second inlet, by a suitably higher air pressure at the one inlet than at the second inlet. However, if desired any other suitable valve means capable of alternatively supplying air from two inlets to an outlet in accordance with a suitable pressure difference may be provided. Such alternative valve means may be electrically operated in accordance with the air pressures being sensed by transducer means. All such valves are generically referred to herein as shuttle valves.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

I claim:

1. A braking system for a trailer vehicle comprising a trailer fluid pressure supply system comprising a source of fluid pressure and a coupling connectable to a fluid pressure outlet of a tractor vehicle transducer means capable of responding to a fluid pressure brake demand signal, delivered to the transducer means from a coupling connectable to a fluid pressure brake demand signal outlet of the tractor vehicle, to provide an electrical brake demand signal; electronic control means responsive to the electrical brake demand signal to provide an electrical brake operating signal; electrically operable valve means having an inlet and an outlet, means to connect said electrically operable valve inlet to said source and means to connect said electrically operable valve outlet to a supply valve means; said electrically operable valve means being responsive to said electrical brake operating signal to provide, at said electrically operable valve outlet, a fluid pressure brake operating signal for said supply valve means; said supply valve means being responsive to a fluid pressure brake operating signal received by said supply valve means to supply fluid from said source to at least one actuator for brake application under a brake pressure determined in accordance with said received fluid pressure brake operating signal and an electrically operable demand signal control valve operable to control delivery of said fluid pressure brake demand signal to the supply valve means to provide an alternative brake operating signal for the supply valve means wherein the electrically operable valve means which is responsive to the electrical brake operating signal comprises a first and a second solenoid valve, the first solenoid valve is operable between a first condition in which it provides for supply of fluid to the second solenoid valve, and a second condition in which it prevents supply of fluid to the second solenoid valve whilst the second solenoid valve is operable between a first condition in which it provides for passage of fluid from the first solenoid valve to provide the fluid pressure brake operating signal to the supply valve means and a second condition in which it provides for exhaust of fluid and reduction of the fluid pressure brake operating signal.

2. A braking system according to claim 1 wherein the solenoid valves are arranged so that, when energized, the first solenoid valve assumes said second condition to provide for no braking and when de-energized the first solenoid valve assumes said first condition to provide for braking.

3. A braking system for a trailer vehicle comprising a trailer fluid pressure supply system comprising a source of fluid pressure and a coupling connectable to a fluid pressure outlet of a tractor vehicle, transducer means capable of responding to a fluid pressure brake demand signal, delivered to the transducer means from a coupling connectable to a fluid pressure brake demand signal outlet of the tractor vehicle, to provide an electrical brake demand signal; electronic control means responsive to the electrical brake demand signal to provide an electrical brake operating signal; electrically operable valve means having an inlet and an outlet, means to connect said electrically operable valve outlet to a supply valve means; said electrically operable valve means being responsive to said electrical brake operating signal to provide, at said electrically operable valve outlet, a fluid pressure brake operating signal for said supply valve means; said supply valve means being responsive to a fluid pressure brake operating signal received by said supply valve means to supply fluid from said source to at least one actuator for brake application under a brake pressure determined in accordance with said received fluid pressure brake operating signal and an electrically operable demand signal control valve to control the supply of fluid from said source to the inlet of the electrically operable valve means wherein the electrically operable demand signal control valve is provided in a passage to feed fluid from said source to the electrically operable valve means to act on the fluid from said source, and there being an upstream shuttle valve upstream of the electrically operable valve means having a first inlet connected to a passage for the fluid pressure demand signal, a second inlet connected to said passage from said source and an outlet connected to the electrically operable valve means, whereby when the electrically operable demand signal control valve restricts supply of the fluid from the source said upstream shuttle valve permits the demand signal to flow to the electrically operable valve means whilst when the demand signal control valve permits less restricted or free supply of fluid from the source, said upstream shuttle valve prevents the fluid pressure brake demand signal from flowing to the electrically operable valve means.

4. A braking system according to claim 3 wherein the system includes an emergency transducer valve responsive to the pressure of fluid in a supply line to the source falling below a predetermined value to feed fluid from the source to a second shuttle valve having a first inlet connected to the fluid pressure brake demand signal control valve, a second inlet connected to said emergency transducer valve and an outlet connected to the second inlet of said upstream shuttle valve whereby fluid from said source may bypass the demand signal control valve when the emergency transducer valve directs fluid pressure from said source responsive to said fluid pressure falling below the predetermined value.

5. A braking system of a trailer vehicle said system comprising, provided on the trailer vehicle, a trailer fluid pressure supply system comprising a source of fluid pressure and a coupling connectable to a fluid pressure outlet of a tractor vehicle, transducer means capable of responding to a fluid pressure brake demand signal, delivered to the transducer means from a coupling connectable to a fluid pressure brake demand signal outlet of the tractor vehicle, to provide an electrical brake demand signal which is dependent on said fluid pressure brake demand signal; electronic control means responsive to the electrical brake demand signal and to a feedback signal to provide an electrical brake operating signal; electrically operable valve means having an inlet and an outlet, means to connect said electrically operable valve inlet to said source, feedback transducer means to provide said feedback signal dependent upon the fluid pressure at said electrically operable valve outlet, and means to connect said electrically operable valve outlet to a supply valve means; said electrically operable valve means being responsive to said electrical brake operating signal to control reduction in fluid pressure at said electrically operable valve outlet, maintain said pressure and control increase in said pressure to provide, at said electrically operable valve outlet, a fluid pressure brake operating signal, which is dependent on said fluid pressure brake demand signal, for said supply valve means; said supply valve means being responsive to a fluid pressure brake operating signal received by said supply valve means to supply fluid from said source to at least one actuator for brake application under a brake pressure determined in accordance with said received fluid pressure brake operating signal and, in addition to and functionally separate from, said electrically operable valve means, means comprising an electrically operable demand signal control valve responsive to presence of electrical supply to said system to prevent, and responsive to absence of said electrical supply to said system to permit delivery of said fluid pressure brake demand signal to the supply valve means to provide an alternative brake operating signal for the supply valve means.

6. A braking system according to claim 5 wherein the electronic control means for controlling the fluid pressure brake operating signal is provided and arranged to operate to provide an anti-lock braking system.

7. A braking system according to claim 6 wherein the system is a multichannel system and comprises a plurality of brake valve means, the electronic control means providing a plurality of separate electrical brake operating signals for said brake valve means.

8. A braking system according to claim 5 wherein the electrically operable valve means and the supply valve means are provided as an integrated unit.

9. A braking system according to claim 5 wherein the electronic control means operates to provide an anti-lock brake system and is integrated with said electrically operable valve means.

10. A braking system according to claim 5 wherein the electronic control means operates to provide and anti-lock braking system and is integrated with the electrically operable valve means and the supply valve means in an integrated unit.

11. A braking system according to claim 5 wherein the electronic control means operates to provide an anti-lock braking system and a multi-channel system is provided, at least some channels of the anti-lock braking system being provided by electronic control units which are integrated in an integrated unit and are integrated with said electronic control unit.

12. A braking system according to claim 5 wherein the system includes fluid emergency supply means to detect a failure of supply of fluid from the tractor to said source and operable to cause brake application in the event of any such failure.

13. A braking system according to claim 12 wherein failure in the supply of fluid pressure is detected by a pressure sensitive emergency transducer valve, the emergency transducer valve being responsive to said fluid pressure falling below a predetermined value to direct fluid pressure from a reservoir to said at least one actuator.

14. A braking system according to claim 5 wherein the electronic control means has an electrical brake demand signal input for connection to an outlet for such a signal on a tractor.

15. A braking system according to claim 5 comprising a plurality of modules, one module providing said electronic control means, a second module providing an emergency supply valve means and at least one third module providing said electrically operable valve means.

16. A braking system according to claim 5 wherein said electrically operable demand signal control valve is responsive to an actuating signal, provided in response to said transducer means detecting a fluid pressure brake demand signal, to interrupt supply of said fluid pressure brake demand signal to said supply valve means and is responsive to absence of said actuating signal to supply said brake demand signal to the supply valve means.

17. A braking system of a trailer vehicle said system comprising, provided on the trailer vehicle, a trailer fluid pressure supply system comprising a source of fluid pressure and a coupling connectable to a fluid pressure outlet of a tractor vehicle, transducer means capable of responding to a fluid pressure brake demand signal, delivered to the transducer means from a coupling connectable to a fluid pressure brake demand signal outlet of the tractor vehicle, to provide an electrical brake demand signal which is dependent on said fluid pressure brake demand signal; electronic control means responsive to the electrical brake demand signal and to a feedback signal to provide an electrical brake operating signal which is dependent on said fluid pressure brake demand signal; electrically operable valve means having an inlet and an outlet, means to connect said electrically operable valve outlet to a supply valve means; feedback transducer means to provide said feedback signal dependent upon the fluid pressure at said electrically operable valve outlet, said electrically operable valve means being responsive to said electrical brake operating signal to control reduction in the fluid pressure at said electrically operable valve outlet, maintain said pressure, and control increase in said pressure to provide at said electrically operable valve outlet, a fluid pressure brake operating signal, which is dependent on said fluid pressure brake demand signal, for said supply valve means; said supply valve means being responsive to a fluid pressure brake operating signal received by said supply valve means to supply fluid from said source to at least one actuator for brake application under a brake pressure determined in accordance with said received fluid pressure brake operating signal and, in addition to and functionally separate from said electrically operable valve means, means comprising an electrically operable demand signal control valve responsive to presence of electrical supply to said system to permit the supply of fluid from said source to the inlet of the electrically operable valve means and prevent delivery of said fluid pressure brake demand signal to the inlet of said electrically operable valve means and responsive to absence of said electrical supply to said system to permit delivery of said fluid pressure brake demand signal to said inlet of the electrically operable valve means to provide an alternative brake operating signal for the supply valve means.

18. A braking system according to claim 17 wherein said electrically operable demand signal control valve is provided to supply fluid from said source to the inlet of the electrically operable valve means in response to an actuating signal provided in response to the transducer means detecting a fluid pressure brake demand signal and to interrupt feed of fluid from said source to said inlet in response to absence of said actuating signal.

19. A braking system according to claim 17 wherein said electrically operable demand signal control valve is provided to supply fluid from said source to the inlet of the electrically operable valve means when the electrically operable demand signal control valve is electrically energised and to interrupt feed of fluid from said source to said inlet and to connect said inlet of the electrically operable valve means to exhaust when electrically de-energized.

20. A braking system according to claim 19 comprising electrical supply means to supply electrical power to said electronic control means from the tractor vehicle via a disconnectable coupling wherein there is provided means for detecting failure of power supply to the braking system and to give a warning if this occurs.

21. A braking system according to claim 17 wherein said electrically operable demand signal control valve is responsive to presence of electrical supply to said system to permit supply of fluid from said source to the inlet of the electrically operable valve means and to prevent delivery of said fluid pressure brake demand signal to the inlet of the electrically operable valve means and responsive to failure of said electrical supply to said system to interrupt feed of fluid from said source to said inlet of the electrically operable valve means and to connect said inlet of the electrically operable valve means to exhaust and to permit delivery of said fluid pressure brake demand signal to said inlet of the electrically operable valve means to provide an alternative brake operating signal for the supply valve means.

22. A braking system of a trailer vehicle said system comprising, provided on the trailer vehicle, a trailer fluid pressure supply system comprising a source of fluid pressure and a coupling connectable to a fluid pressure outlet of a tractor vehicle, transducer means capable of responding to a fluid pressure brake demand signal, delivered to the transducer means from a coupling connectable to a fluid pressure brake demand signal outlet of the tractor vehicle, to provide an electrical brake demand signal which is dependent on said fluid pressure brake demand signal; electronic control means responsive to the electrical brake demand signal and to a feedback signal to provide an electrical brake operating signal; electrically operable valve means having an inlet and an outlet, means to connect said electrically operable valve inlet to said source, means to connect said electrically operable valve outlet to a supply valve means and feedback transducer means to provide said feedback signal dependent upon the fluid pressure at said electrically operable valve outlet; said electrically operable valve means being responsive to said electrical brake operating signal to provide, at said electrically operable valve outlet, a fluid pressure brake operating signal originating from said source for said supply valve means and which is dependent on said fluid pressure brake demand signal; said supply valve means being responsive to a fluid pressure brake operating signal received by said supply valve means to supply fluid from said source to at least one actuator for brake application under a brake pressure determined in accordance with said received fluid pressure brake operating signal and, in addition to and functionally separate from, said electrically operable valve means, means comprising an electrically operable demand signal control valve responsive to presence of electrical supply to said system to prevent, and responsive to absence of said electrical supply to said system to permit delivery of said fluid pressure brake demand signal to said supply valve means to provide an alternative brake operating signal for the supply valve means and wherein the electrically operable valve means which is responsive to the electrical brake operating signal comprises a first and second electrically operable valve, said valves being operable between a first condition to provide a fluid pressure brake operating signal to the supply valve means, a second condition to provide for exhaust of fluid from the supply valve means and reduction of the fluid pressure brake operating signal and a third condition to block fluid flow and maintain the fluid pressure brake operating signal constant.

23. A braking system according to claim 22 comprising emergency valve means to connect said source to the supply valve means to provide said received brake operating signal thereof when the pressure in the supply to said source falls below a predetermined value.

24. A braking system according to claim 22 wherein said electrically operable demand signal control valve is responsive to presence of electrical supply to said system to permit supply of fluid from said source to the supply valve means and to prevent delivery of said fluid pressure brake demand signal to the supply valve means and responsive to failure of said electrical supply to said system to interrupt feed of fluid from said source to said supply valve means and to permit delivery of said fluid pressure brake demand signal to said supply valve means to provide an alternative brake operating signal for the supply valve means.

25. A braking system for a trailer vehicle comprising a trailer fluid pressure supply system comprising a source of fluid pressure and a coupling connectable to a fluid pressure outlet of a tractor vehicle, transducer means capable of responding to a fluid pressure brake demand signal, delivered to the transducer means from a coupling connectable to a fluid pressure brake demand signal outlet of the tractor vehicle, to provide an electrical brake demand signal; electronic control means responsive to the electrical brake demand signal to provide an electrical brake operating signal; electrically operable valve means having an inlet for fluid from said source and an outlet, means to connect said electrically operable valve outlet to a supply valve means; said electrically operable valve means being responsive to said electrical brake operating signal to provide, at said electrically operable valve outlet, a fluid pressure brake operating signal originating from said source for said supply valve means; said supply valve means being responsive to a fluid pressure brake operating signal received by said supply valve means to supply fluid to at least one actuator for brake application under a brake pressure determined in accordance with said received fluid pressure brake operating signal, and means comprising an electrically operable demand signal control valve, to interrupt said fluid pressure brake operating signal, and means comprising an electrically operable demand signal control valve, to interrupt said fluid pressure brake operating signal originating from said source and alternatively to supply said fluid pressure brake demand signal to said supply valve means to provide said received fluid pressure brake operating signal thereof and comprising emergency valve means to connect said source to the supply valve means to provide said received brake operating signal thereof when the pressure in the supply to said source falls below a predetermined value comprising a shuttle valve connected between a first line connected to said emergency valve means and a second line carrying connected to said fluid pressure brake demand signal control valve to shut off the first line and connect the second line to the supply valve means when said emergency valve is operative to feed fluid from said source to said supply valve means.

26. A braking system for a trailer vehicle comprising a trailer fluid pressure supply system comprising a source of fluid pressure and a coupling connectable to a fluid pressure outlet of a tractor vehicle, transducer means capable of responding to a fluid pressure brake demand signal, delivered to the transducer means from a coupling connectable to a fluid pressure brake demand signal outlet of the tractor vehicle, to provide an electrical brake demand signal; electronic control means responsive to the electrical brake demand signal to provide an electrical brake operating signal; electrically operable valve means having an inlet and an outlet, means to connect said electrically operable valve inlet to said source and means to connect said electrically operable valve outlet to a supply valve means; said electrically operable valve means being responsive to said electrical brake operating signal to provide, at said electrically operable valve outlet, a fluid pressure brake operating signal for said supply valve means; said supply valve means being responsive to a fluid pressure brake operating signal received by said supply valve means to supply fluid from said source to at least one actuator for brake application under a brake pressure determined in accordance with said received fluid pressure brake operating signal and an electrically operable demand signal control valve operable to control delivery of said fluid pressure brake demand signal to the supply valve means to provide an alternative brake operating signal for the supply valve means wherein said brake demand signal control valve has an inlet and an outlet for fluid pressure from said source and is operable to permit or interrupt passage of said fluid pressure from said source from said electrically operable brake demand control valve inlet to said electrically operable brake demand control valve outlet and said electrically. operable brake demand control valve outlet being connected to one inlet port of a shuttle valve, a second inlet port of said shuttle valve being connected so as to be supplied with said fluid pressure brake demand signal and an outlet of said shuttle valve being connected to said inlet of the electrically operable valve means.

* * * * *